(12) United States Patent
Ishizaki et al.

(10) Patent No.: US 8,688,909 B2
(45) Date of Patent: Apr. 1, 2014

(54) STORAGE APPARATUS AND DATA MANAGEMENT METHOD

(75) Inventors: Taro Ishizaki, Odawara (JP); Toshihiko Shinozaki, Odawara (JP); Hideki Nagasaki, Odawara (JP); Daisuke Komaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 13/141,948

(22) PCT Filed: Jun. 7, 2011

(86) PCT No.: PCT/JP2011/003212
§ 371 (c)(1),
(2), (4) Date: Jun. 23, 2011

(87) PCT Pub. No.: WO2012/168967
PCT Pub. Date: Dec. 13, 2012

(65) Prior Publication Data
US 2012/0317355 A1    Dec. 13, 2012

(51) Int. Cl.
*G06F 12/00* (2006.01)
(52) U.S. Cl.
USPC ..... 711/114; 711/154; 711/165; 711/E12.001
(58) Field of Classification Search
USPC ............ 711/114, 154, 165, E12.001
See application file for complete search history.

(56) References Cited

U.S. PATENT DOCUMENTS

| 2008/0082777 A1* | 4/2008 | Sakaguchi et al. ............ 711/170 |
| 2008/0126734 A1 | 5/2008 | Murase |
| 2010/0125715 A1 | 5/2010 | Takamatsu et al. |
| 2010/0191908 A1 | 7/2010 | Yamakawa |

FOREIGN PATENT DOCUMENTS

| JP | 2008299559 A | 12/2008 |
| JP | 2010122814 A | 6/2010 |

* cited by examiner

*Primary Examiner* — Jasmine Song
(74) *Attorney, Agent, or Firm* — Volpe and Koenig, P.C.

(57) ABSTRACT

A suitable Tier ratio is determined according to the I/O performance and I/O characteristic of a virtual volume. A storage apparatus which is connected via a network to a host computer which requests data writing comprises storage devices of a plurality of types of varying performance; and a controller which manages storage areas provided by each of the storage devices of a plurality of types by means of storage tiers of a plurality of different types, and which assigns the storage areas in page units to virtual volumes from any of the storage tiers among the storage tiers of the plurality of types according to the data write request from the host computer, wherein the controller monitors performance information which includes I/O characteristic information for each of the virtual volumes and determines the storage tiers corresponding to the performance information thus monitored, and assigns the storage areas in page units to the virtual volumes from the determined storage tiers.

8 Claims, 32 Drawing Sheets

FIG. 3
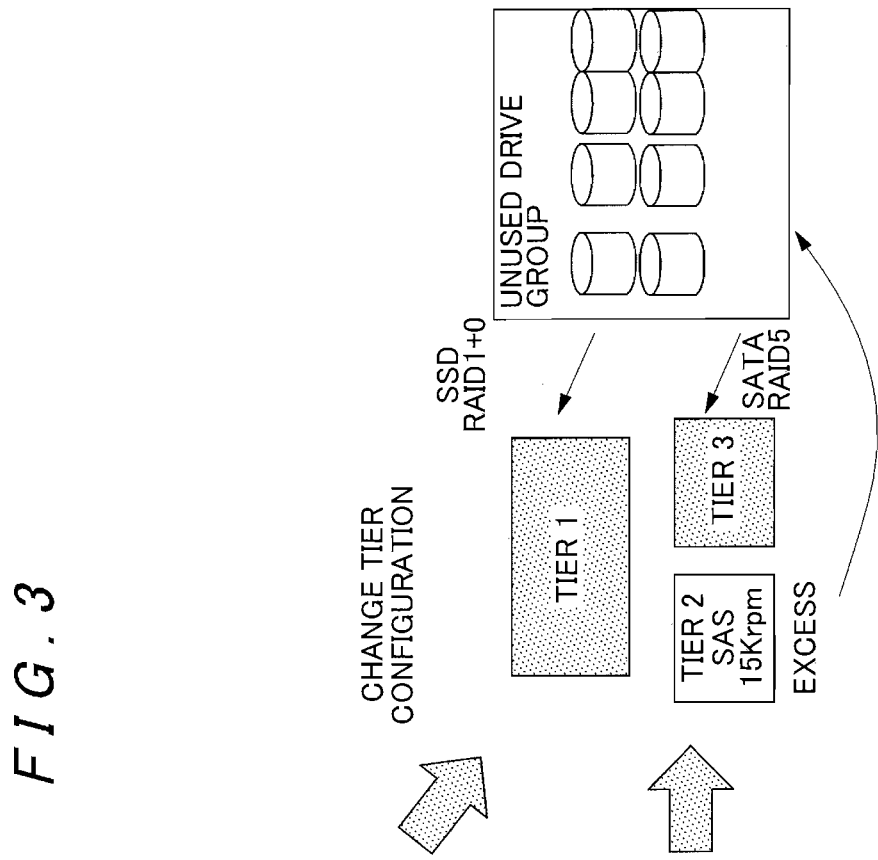
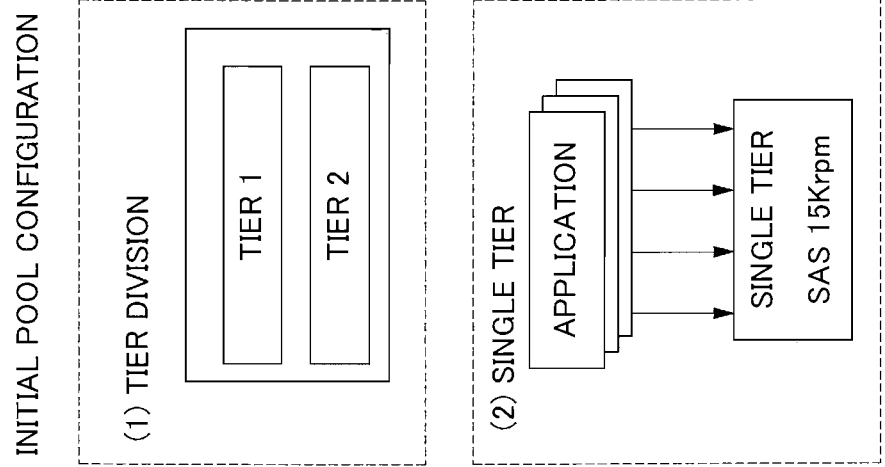

FIG. 5

| VIRTUAL VOLUME ID | POOL ID | VIRTUAL PAGE ID | REAL PAGE ID |
|---|---|---|---|
| V01 | POOL0 | P01 | P11 |
| | | P02 | P12 |
| | | P03 | P13 |
| V02 | POOL1 | P04 | P14 |
| | | P05 | P15 |
| | | P06 | P16 |
| ... | ... | ... | ... |
| 2511 | 2512 | 2513 | 2514 |

| POOL ID | POOL VOLUME ID | REAL PAGE ID | TIER | MEDIA TYPE | RAID GROUP | RAID LEVEL | LDEV ID |
|---|---|---|---|---|---|---|---|
| POOL0 | V11 | P11 | 1 | SSD | 1 | RAID5 (3D+1P) | 0001 |
| | | P12 | 1 | SSD | 1 | RAID5 (3D+1P) | 0001 |
| | V12 | P13 | 1 | SSD | 1 | RAID5 (3D+1P) | 0001 |
| POOL1 | V13 | P14 | 2 | SAS | 2 | RAID5 (3D+1P) | 0002 |
| | | P15 | 3 | SATA | 3 | RAID1+0 (2D+2D) | 0003 |
| | | P16 | 3 | SATA | 3 | RAID1+0 (2D+2D) | 0003 |
| ... | ... | ... | ... | ... | ... | ... | ... |

| REAL PAGE ID | I/O CHARACTERISTIC | READ/WRITE RATIO | ACCESS FREQUENCY | RESPONSE TIME |
|---|---|---|---|---|
| P11 | RANDOM | 50:50 | 5 | 20 ms |
| P12 | RANDOM | 50:50 | 5 | 20 ms |
| P13 | RANDOM | 50:50 | 5 | 20 ms |
| P14 | RANDOM | 50:50 | 5 | 20 ms |
| P15 | SEQUENTIAL | 70:30 | 10 | 15 ms |
| P16 | SEQUENTIAL | 70:30 | 10 | 15 ms |
| ... | ... | ... | ... | ... |
| 2531 | 2532 | 2533 | 2534 | 2535 |

| VIRTUAL VOLUME ID | ACCESS FREQUENCY | I/O PERFORMANCE | PRIORITY LEVEL | REQUEST PERFORMANCE | TIER RATIO |
|---|---|---|---|---|---|
| V01 | 500 | RANDOM | 1 | HIGH | TIER 1: 80, TIER 2: 20 |
| V02 | 400 | RANDOM | 2 | INTERMEDIATE | TIER 1: 50, TIER 2: 30, TIER 3: 20 |
| V03 | 300 | SEQUENTIAL | 3 | LOW | TIER 1: 30, TIER 2: 20, TIER 3: 50 |
| ... | ... | ... | ... | ... | ... |

| RANK (PRIORITY) | IOPS | I/O CHARACTERISTIC | READ/ WRITE RATIO | REQUEST PERFOR- MANCE | SUITABLE MEDIA TYPE | PERFORMANCE (REVOLUTIONS) | RAID LEVEL | IDEAL TIER |
|---|---|---|---|---|---|---|---|---|
| 1 | 500 | RANDOM | 50:50 | HIGH | SSD | – | RAID5 (3D+1P) | TIER 1 |
| 2 | 400 | RANDOM | 80:20 | HIGH | SSD | – | RAID1+0 (4D+4D) | TIER 1 |
| 3 | 300 | SEQUENTIAL | 60:40 | INTERME- DIATE | SAS | 15,000rpm | RAID5 (3D+1P) | TIER 2 |
| 4 | 200 | SEQUENTIAL | 70:30 | LOW | SAS | 10,000rpm | RAID1+0 (4D+4D) | TIER 2 |
| 5 | 100 | RANDOM | 90:10 | LOW | SATA | 7,200rpm | RAID1+0 (2D+2D) | TIER 3 |
| ... | ... | ... | ... | ... | ... | ... | ... | ... |

| REAL PAGE ID | VIRTUAL VOLUME ID | CURRENT TIER | CURRENT DRIVE | IDEAL DRIVE | PAGE MIGRATION REQUIREMENT | MIGRATION CANDIDATE TIER |
|---|---|---|---|---|---|---|
| 1 | 1 | TIER 1 | SSD, – RAID5 (3D+1P) | SATA, 15Krpm, RAID1+0 (4D+4D) | MIGRATION REQUIRED | TIER 3 |
| 2 | 3 | TIER 2 | SAS, 7.2Krpm, RAID6 (6D+2P) | SATA, 10Krpm, RAID5 (3D+1P) | MIGRATION REQUIRED | TIER 4 |
| 3 | 4 | TIER 3 | SATA, 15Krpm, RAID1+0 (4D+4D) | SATA, 15Krpm, RAID1+0 (4D+4D) | MIGRATION NOT REQUIRED | TIER 3 |
| ... | ... | ... | ... | ... | ... | ... |

| TIER NUMBER | MEDIA TYPE | PERFORMANCE | RAID LEVEL | TOTAL CAPACITY | ASSIGNED CAPACITY |
|---|---|---|---|---|---|
| TIER 1 | SSD | - | RAID5 (3D+1P) | 1TB | 500GB |
| TIER 2 | SAS | 7,200 rpm | RAID6 (6D+2P) | 5TB | 3TB |
| TIER 3 | SATA | 15,000 rpm | RAID1+0 (4D+4D) | 15TB | 7TB |
| TIER 4 | SATA | 10,000 rpm | RAID5 (3D+1P) | 10TB | 9TB |
| ... | ... | ... | ... | ... | ... |

| POOL ID | CURRENT TIER RATIO | IDEAL TIER RATIO | CONFIGURATION DRIVE COUNT |
|---|---|---|---|
| POOL 1 | TIER 1: 50, TIER 2: 30, TIER 3: 20 | TIER 1: 40, TIER 1.5: 10, TIER 2: 30, TIER 3: 20 | 50 |
| POOL 2 | TIER 1: 30, TIER 2: 20, TIER 3: 50 | TIER 1: 30, TIER 1.5: 10, TIER 2: 10, TIER 3: 50 | 30 |
| ... | ... | ... | ... |

| DRIVE ID | ASSIGNED POOL | DRIVE TYPE | PERFORMANCE (ROTATIONAL SPEED) | CAPACITY |
|---|---|---|---|---|
| 01 | POOL 1 | SAS | 10Krpm | 300GB |
| 02 | (UNASSIGNED) | SSD | - - - | 200GB |
| ... | ... | ... | ... | ... |
| 2591 | 2592 | 2593 | 2594 | 2595 |

| CONFIGURATION ITEM | CONFIGURATION VALUE |
|---|---|
| PRIOR ITEM | COST |
| RANK THRESHOLD | 3 |

| PROCESSING EXECUTION CONTENT |
|---|
| TIER 4 CREATION (CREATION OF RAID 1 + 0 (2D + 2D) ON FOUR SSD DRIVES WHICH ARE DRIVES 02, 05, 06, 07) |
| TIER 2 CONFIGURATION MODIFICATION (MODIFY TIER 2 RAID LEVEL FROM RAID 6 (6D + 2P) TO RAID 5 (4D + 1P)) |
| ... |

270

STORAGE APPARATUS AND DATA MANAGEMENT METHOD

TECHNICAL FIELD

The present invention relates to a storage apparatus and data management method, and is suitably applied to a storage apparatus having a built-in hierarchical-type data management function, for example.

BACKGROUND ART

In recent years, a virtualization function called Thin Provisioning has been the focus of attention as one of the functions that is installed in a storage apparatus. The Thin Provisioning function is a function which provides a virtual logical volume (hereinafter referred to as a virtual volume) to a host computer and for dynamically assigning storage areas to the virtual volume when a request to write data to the virtual volume is issued by the host computer. The Thin Provisioning function allows a virtual volume with a larger capacity than the storage area which can actually be provided to be provided to the host computer, and is advantageous in that a computer system can be constructed at low cost by reducing the physical storage capacity in the storage apparatus which is to be pre-prepared.

As a data management method of a storage apparatus with this built-in Thin Provisioning function, a hierarchical-type data management method has conventionally been proposed (PTL1, PTL2, for example). The hierarchical-type data management method is a method which manages storage areas provided by each of the storage devices of a plurality of types of varying performance which are installed in the storage apparatus as storage tiers of a plurality of different types, assigns storage areas from high-speed and high-performance storage tiers to areas in which data of a high access frequency in the virtual volume is stored, and assigns storage areas from low-speed and low-performance storage tiers to areas in which data of a low access frequency in the virtual volume is stored. This hierarchical-type data management method makes it possible to improve the cost performance of the storage apparatus.

CITATION LIST

Patent Literature

PTL 1: Japanese Published Unexamined Patent Application No. 2010-122814
PTL 2: Japanese Published Unexamined Patent Application No. 2008-299559

SUMMARY OF INVENTION

Technical Problem

However, in the cloud environment of recent years, a plurality of applications are operated by a plurality of users and application usage is wide-ranging, and hence, in storage hierarchical control which is based only on the access frequency of virtual volumes, the performance required for each application may not be met. For example, if the storage area of a predetermined storage tier is assigned to the virtual volume accessed by the application, the performance of the virtual volume is not only the performance of the assigned storage tier, the I/O issued by each application is also dependent on I/O characteristics such as sequential I/O or random I/O.

Hence, the storage tiers are desirably determined not only by considering the access frequency of each storage area assigned to the virtual volume, but also the I/O characteristic of the virtual volume. In addition, if the storage tier is determined according to the required application performance, the performance of the overall system can be improved.

The present invention was conceived in view of the foregoing points, and proposes a storage apparatus and data management method with which a suitable Tier ratio can be determined according to the virtual volume I/O performance and I/O characteristic.

Solution to Problem

In order to achieve the foregoing object, the present invention provides a storage apparatus connected via a network to a host computer which requests data writing, comprising storage devices of a plurality of types of varying performance; and a controller which manages storage areas provided by each of the storage devices of a plurality of types by means of storage tiers of a plurality of different types, and which assigns the storage areas in page units to virtual volumes from any of the storage tiers among the storage tiers of the plurality of types according to the data write request from the host computer, wherein the controller monitors performance information which includes I/O characteristic information for each of the virtual volumes and determines the storage tiers corresponding to the performance information thus monitored, and assigns the storage areas in page units to the virtual volumes from the determined storage tiers.

With this configuration, the storage apparatus monitors the performance information including the I/O characteristic information for each of the virtual volumes and determines the storage tiers which correspond to the monitored performance information from the storage tiers of a plurality of types provided by the storage devices of a plurality of types, and assigns the storage areas in page units to the virtual volumes from the storage tiers. Accordingly, the storage areas of the suitable storage tiers can be assigned to the virtual volumes by considering I/O characteristics other than the I/O performance such as the virtual volume access frequency.

Advantageous Effects of Invention

The present invention makes it possible to improve the overall performance of the apparatus by determining a suitable Tier ratio according to the I/O performance and I/O characteristic of the virtual volume.

BRIEF DESCRIPTION OF DRAWINGS

FIG. 3 is a conceptual diagram illustrating a Tier configuration according to this embodiment.
FIG. 5 is a diagram showing an example of a virtual page management table according to this embodiment.
FIG. 6 is a diagram showing an example of a real page management table according to this embodiment.

FIG. 10 is a diagram showing an example of a performance monitoring table according to this embodiment.

FIG. 11 is a diagram showing an example of a virtual volume management table according to this embodiment.

FIG. 12 is a diagram showing an example of a drive performance rank table according to this embodiment.

FIG. 14 is a diagram showing an example of an I/O characteristic table according to this embodiment.

FIG. 15 is a diagram showing an example of a hierarchical management table according to this embodiment.

FIG. 16 is a diagram showing an example of a Tier ratio management table according to this embodiment.

FIG. 19 is a diagram showing an example of an assignment management table according to this embodiment.

FIG. 20 is a diagram showing an example of a user configuration management table according to this embodiment.

FIG. 22 is a diagram showing an example of a new Tier creation/configuration modification processing list according to this embodiment.

DESCRIPTION OF EMBODIMENTS

An embodiment of the present invention will be described in detail hereinbelow with reference to the drawings.

(1) Hardware Configuration of Computer System

Figure 1:
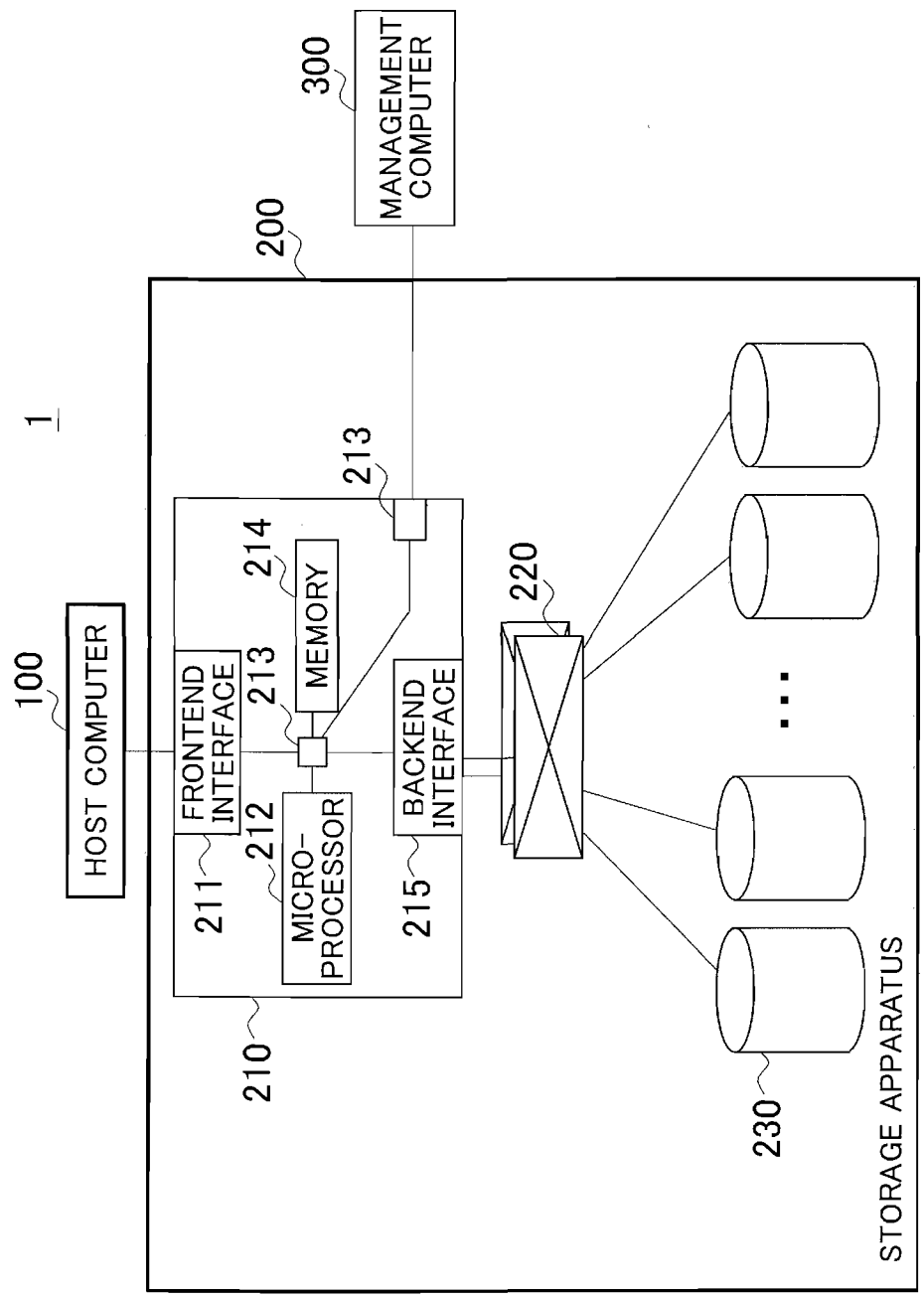
FIG. 1 is a block diagram showing the overall configuration of a computer system according to an embodiment of the present invention.

The hardware configuration of a computer system 1 according to this embodiment will first be described. As shown in FIG. 1, the computer system 1 is configured from a host computer 100, a storage apparatus 200, and a management computer 300.

The host computer 100 is a computer device which comprises information processing resources such as a CPU (Central Processing Unit) and a memory and is configured, for example, from a personal computer, a workstation, or a mainframe, or the like. The CPU functions as an arithmetic processing device and controls the operation of the host computer 100 according to programs and arithmetic parameters which are stored in the memory. Furthermore, the host computer 100 comprises information input devices such as a keyboard, a switch, a pointing device, and a microphone, and information output devices such as a monitor display and speakers.

Furthermore, the host computer 100 is connected to a storage apparatus 200 via a network (not shown). The network is configured from a SAN (Storage Area Network), for example, and communication between the apparatuses is performed according to the Fiber Channel Protocol, for example. Furthermore, the network may be a LAN (Local Area Network), the Internet, a public line or a dedicated line or the like, for example. If the network is a LAN, communication between the apparatuses is performed according to the TCP/IP (Transmission Control Protocol/Internet Protocol) protocol, for example.

In addition, the host computer 100 is a device which performs predetermined task processing by executing various software (applications) such as a database management system. Furthermore, one or all the data used in the task processing which is executed by the host computer 100 is stored in the storage apparatus 200. The host computer 100 transmits a read request or write request to the storage apparatus 200 via the network in order to refer to and update the data stored in the storage apparatus 200.

The storage apparatus 200 is connected to the host computer 100 via the network, and parses commands transmitted from the host computer 100 and executes reading/writing from and to the storage media in the storage apparatus.

In addition, the storage apparatus 200 is configured from a controller 210, a connection device 220, and storage devices 230.

The controller 210 controls data I/Os to and from the storage devices 230 and is configured from a frontend interface 211, a microprocessor 212, a transfer circuit 213, a memory 214, and a backend interface 215.

The frontend interface 211 comprises one or more ports for connecting to the host computer 100 and is connected to the host computer 100 via these ports and receives read/write requests from the host computer 100. The microprocessor 212 calls various programs which are stored in the memory 214 via the transfer circuit 213 and controls the overall operation in the storage apparatus 200 according to the programs. The memory 214 stores the programs and arithmetic parameters which are used by the microprocessor 212 and is configured from a ROM (Read Only Memory) and a RAM (Random Access Memory) and the like. Various programs and various tables which are stored in the memory 214 will be described in detail subsequently. The backend interface 215 is connected to the storage devices 230 via the connection device 220 and sends and receives data to and from the storage devices 230 based on the control by the microprocessor 212.

The storage devices 230 are configured from semiconductor memory such as SSD (Solid State Drive), from high-cost, high-performance disk devices such as SAS (Serial Attached SCSI) disks or FC (Fibre Channel) disks, and from low-cost, low-performance disk devices such as SATA (Serial AT Attachment) disks.

The management computer 300 is a computer device which comprises information processing resources such as a CPU and memory and is configured, for example, from a personal computer, a workstation, and a mainframe. The CPU functions as an arithmetic processing device and controls the operation of the management computer 300 according to the programs and arithmetic parameters and the like which are stored in the memory. In addition, the management computer 300 is a device which comprises information input devices such as a keyboard, a switch, a pointing device, and a microphone, and information output devices such as a monitor display and a speaker, and which manages the storage apparatus 200 in response to inputs by an operator or the like.

In addition, the management computer 300 is connected to the storage apparatus 200 via a network (not shown). The network is configured, for example, from a SAN or a LAN.

Furthermore, the programs which are stored in the memory of the management computer 300 are programs which manage the storage media and the like of the storage apparatus 200 and manage RAID group configurations as well as the capacity and the like of the logical volumes configured from part of the RAID group, for example. The management computer 300 transmits commands corresponding to user operations and the like to the storage apparatus 200 and changes RAID configuration information and the like.

(2) Data Management Method for Storage Apparatus

Figure 2:
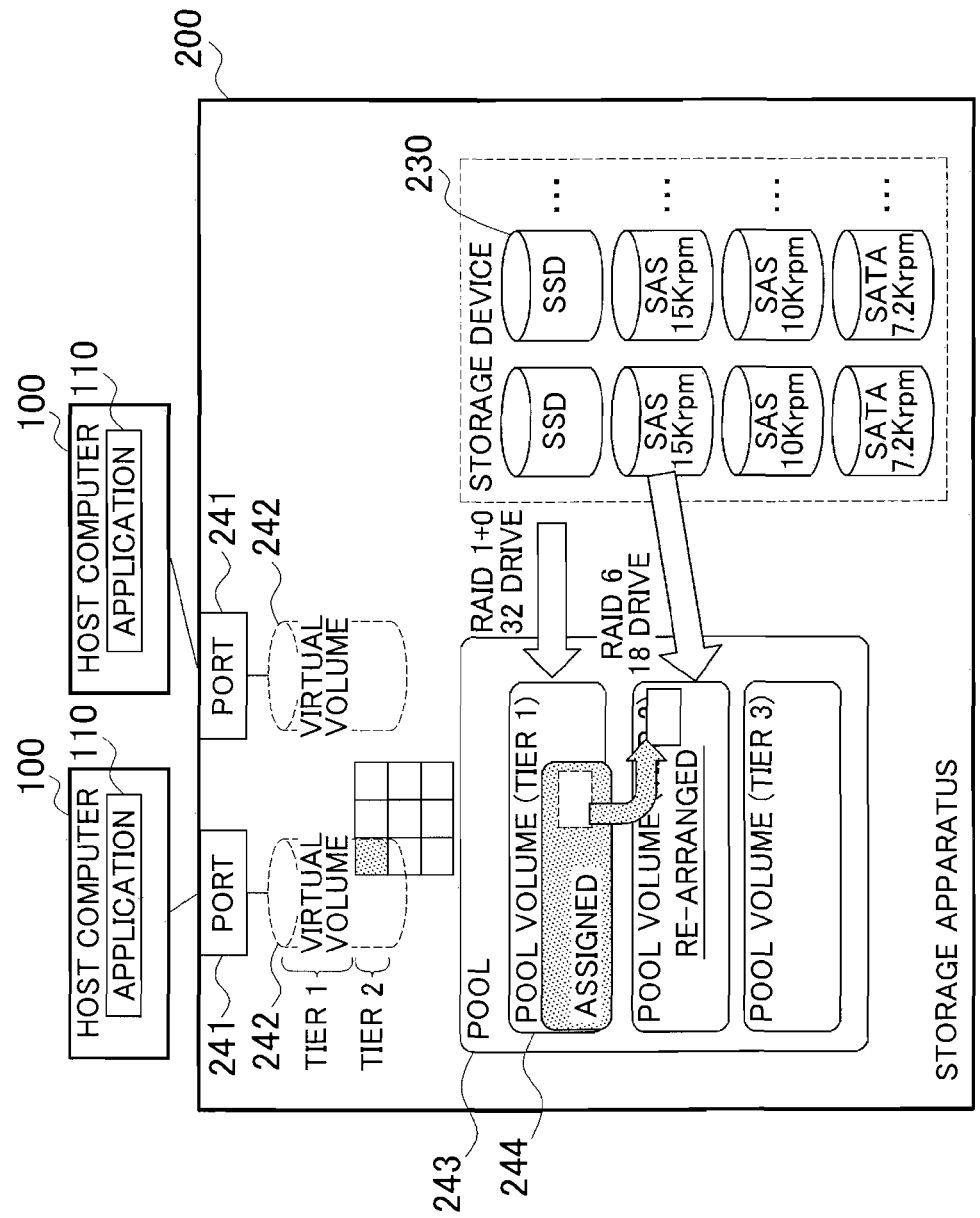
FIG. 2 is a conceptual diagram showing a logical configuration of a storage apparatus according to this embodiment.

The data management method for the storage apparatus 200 will be described next. The logical configuration of the storage apparatus 200 will be described first with reference to FIG. 2. In the storage apparatus 200, a RAID group is defined by one or more storage devices 230 of the same type (SSD, SAS, SATA and the like) and one or more pool volumes 244 are defined in a storage area which is provided by one or more storage devices 230 which constitute a single RAID group. In addition, the pool volumes 244 which are defined in storage areas which are provided by storage devices 230 of the same type are each managed as storage tiers of the same type, and a plurality of pool volumes 244 which belong to mutually different storage tiers are managed as a single pool 243.

In this embodiment, as mentioned earlier, storage devices 230 of three types, namely, SSD, SAS disks and SATA disks, are used as the storage devices 230, and pool volumes defined in storage areas which are provided by one or more SSD are managed as a storage tier called Tier 1, pool volumes which are defined in storage areas provided by one or more SAS disks are managed as a storage tier known as Tier 2, and pool volumes which are defined in storage areas which are provided by one or more SATA disks are managed as a storage tier known as Tier 3.

Note that, among these types of storage devices 230 (SSD, SAS, and SATA), the storage device 230 which is the most reliable and with the best response performance is SSD, the storage device 230 which is the next most reliable and with the next best response performance is the SAS disk, and the storage device 230 with the lowest reliability and response performance is the SATA disk. Accordingly, in the case of this embodiment, among the three tiers which constitute the pool volume 244, the storage tier which is the most reliable and with the best response performance is Tier 1, the storage tier which is the next most reliable and with the next best response performance is Tier 2, and the storage tier with the lowest reliability and response performance is Tier 3.

Meanwhile, one or more virtual volumes 242 are defined in the storage apparatus 200. Unique identifiers (hereinafter called LUN (Logical Unit Number)) are assigned to each of the virtual volumes 242. In addition, the area in the virtual volumes 242 is divided into blocks of a predetermined size (hereinafter called logical blocks) and managed using unique numbers (hereinafter called LBA (Logical Block Address)) which are assigned to each of the logical blocks. Data I/O requests (write requests and read requests) from the host computer 100 to the virtual volumes 242 are made by designating the LUN of the virtual volume 242 from/to which data is read/written, the LBA of the leading logical block in the area from/to which data in the virtual volume 242 is read/written, and the data length.

Any one of the pools 243 is pre-associated with each virtual volume 242. Furthermore, if a data write request from the host computer 100 to the virtual volume 242 is received, the storage apparatus 200 assigns, in units of a predetermined size known as pages, storage area in the required amount from the pool 243 associated with the virtual volume to the area designated by the write request in the virtual volume 242 designated by the write request, and writes write target data to the assigned page.

Here, pages are basic units of storage area assigned to the virtual volume 242 from any of the storage tiers (Tier 1 to Tier 3) which constitute the pool 243 associated with the virtual volume 242. In the following description, a single page is described as a storage area of the same size as a single logical block of the virtual volume 242 but is not necessarily limited to such a storage area. Furthermore, in this embodiment, a page which is assigned to each of the virtual volume 242 is described hereinafter as a real page, and a single logical block of a virtual volume is described hereinafter as a virtual page.

Furthermore, when pages are assigned from the corresponding pool 243 to the virtual volume 242, the storage apparatus 200 assigns pages in order starting with the pool volume 244 which belongs to the most reliable storage tier with the best response performance among the assignable pool volumes 244. Hence, the storage apparatus 200 assigns pages from the pool volume 244 to the virtual volume 242 until pages not yet assigned to the pool volume 244 are depleted in the following order: the pool volume 244 belonging to Tier 1, the pool volume 244 which belongs to Tier 2, and the pool volume 244 which belongs to Tier 3.

Meanwhile, the storage apparatus 200 monitors the frequency of access by the host computer 100 per unit of time to the virtual pages of the virtual volume 242 in parallel with the processing to assign pages to the virtual volume 242. In addition, one characteristic of the storage apparatus 200 according to this embodiment is that the storage apparatus 200 monitors I/O characteristics such as whether the I/O issued by an application 110 of the host computer 100 is a sequential I/O or random I/O, the read/write ratio, and the level of the required application performance, and the like, and determines the Tier ratio in virtual volume 242 units by considering not only the access frequency but also the I/O characteristic and required application performance. That is, the storage apparatus 200 considers the access frequency per unit of time, the I/O characteristic, and the required application performance so that data is migrated between Tier 1, Tier 2, and Tier 3 by assigning storage devices which are suited to the performance and characteristics of the virtual volume 242.

Furthermore, according to this embodiment, as mentioned earlier, regardless of whether a plurality of Tiers exist in the pool 243 or only a single Tier exists, the Tier ratio can be determined according to the I/O characteristic and required application performance and the like.

For example, as shown in FIG. 3, if there are a plurality of Tiers (Tier 1 and Tier 2) which are provided by storage devices 230 of a plurality of types and hierarchical control is performed by monitoring only the access frequency, the I/O characteristic and required application performance and the like are also monitored to determine the Tier ratio. Even in cases where, as a result of monitoring the access frequency alone, data is stored in pool volumes 244 which belong to Tier 1 and Tier 2, the performance of the storage apparatus 200 overall sometimes improves as a result of storing data in Tier 1 and Tier 3 as a result of monitoring the I/O characteristics other than the access frequency.

If, for example, the access frequency per unit of time to a virtual page of the virtual volume 242 is small and the I/O characteristic of the virtual page is random I/O, data must be stored in an SSD, which is a high-performance storage device. Furthermore, in a case where, even though the access frequency per unit of time to the virtual page of the virtual volume 242 is large, the I/O characteristic of the virtual page is sequential I/O, data is stored on a SATA disk, which is suited to sequential access, instead of an SSD, which is a high-performance storage device or an SAS disk which has the next highest performance. The storage areas of unused SAS disks are managed as an unused drive group. The performance of the storage apparatus 200 overall can be improved by determining a suitable Tier ratio for each virtual volume 242 by considering not only the access frequency but also I/O characteristics other than the access frequency. User convenience can also be improved by determining the storage devices storing data according to the required application performance.

In addition, even if only a single Tier exists in the pool 243, for example, if only a single Tier provided by SAS exists as shown in FIG. 3, the logical Tier ratio is determined by monitoring the I/O characteristic and the access frequency per unit of time of the virtual page. The system administrator is able to construct a system which improves overall apparatus performance and user convenience by adding the storage devices on the basis of the logical Tier ratio thus determined.

Furthermore, when the Tier configuration is reconstructed on the basis of the logical Tier ratio, if the capacity of a disposed Tier is inadequate, a new Tier is created, and the RAID configuration of the existing Tiers is updated in order to make effective usage of the existing storage devices. For example, when data which is stored in a storage device which belongs to Tier 2 is migrated to Tier 1, the capacity of migration-destination Tier 1 may be inadequate, rendering migration impossible. In this case, expanding the capacity of Tier 1 may also be considered, but there is the problem that the physical expansion of the storage device takes time and is costly. Furthermore, although consideration may also be paid to securing capacity for Tier 1 by migrating existing data which is stored in Tier 1 to another Tier, the migration of data to a low-stability tier may bring about a drop in the overall performance of the system.

Therefore, according to this embodiment, a RAID group with a new RAID configuration is created from storage devices with an unused area of Tier 2 and is assigned to the pool 243, and a higher performance Tier than the existing Tier 2 is newly constructed. Furthermore, by migrating data by using the newly constructed Tier and the existing Tiers, overall apparatus performance can be improved while adopting the existing resources. In addition, when a new Tier is constructed, not only is the RAID configuration, such as the number of storage devices constituting the RAID, modified, but the RAID level may also be modified. A Tier with a different performance from the existing Tier 2 can thus be constructed by creating a RAID group with a new RAID level.

Figure 4:
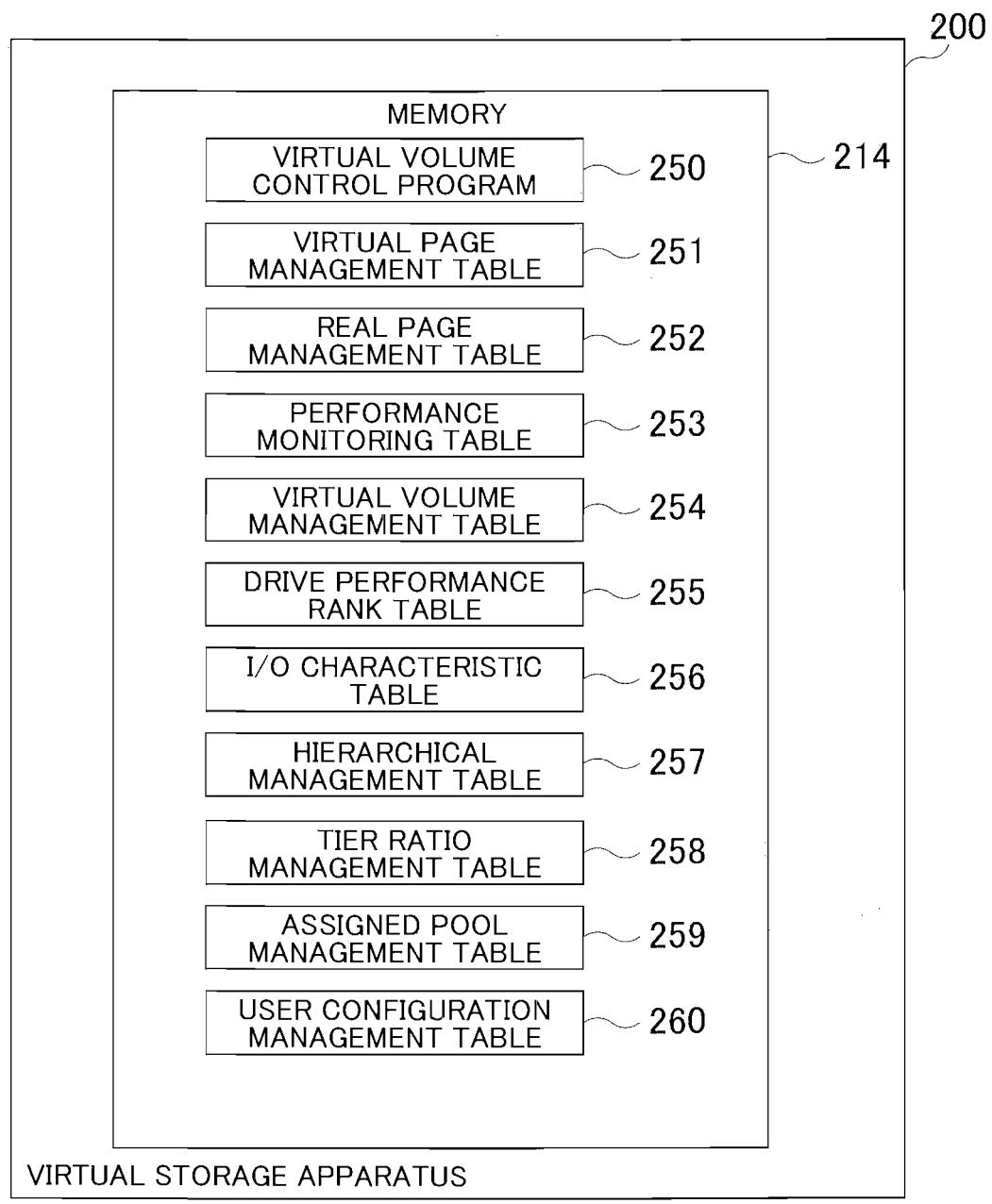
FIG. 4 is a block diagram showing a memory configuration of the storage apparatus according to this embodiment.

As means for implementing the data management method according to this embodiment as described hereinabove, the memory 214 of the storage apparatus 200 stores, as shown in FIG. 4, a virtual volume control program 250, a virtual page management table 251, a real page management table 252, a performance monitoring table 253, a virtual volume management table 254, a drive performance rank table 255, an I/O characteristic table 256, a hierarchical management table 257, a Tier ratio management table 258, an assignment pool management table 259, and a user configuration management table 260.

The virtual volume control program 250 is a program which, if there is a data write request from the host computer 100 to the virtual volume 242, executes page assignment processing which assigns real pages from the corresponding storage tiers Tier 1 to Tier 3 to the virtual volume 242, and page re-arrangement processing for migrating data, if necessary, between the storage tiers Tier 1 to Tier 3 by monitoring the I/O characteristic and access frequency per unit of time by the host computer 100 for each virtual page at regular or irregular intervals.

The virtual page management table 251 is a table for managing the virtual pages of the virtual volumes 242 defined in the storage apparatus 200 by the virtual volume control program 250 and, as shown in FIG. 5, is configured from a virtual volume ID field 2511, a pool ID field 2512, a virtual page ID field 2513, and a real page ID field 2514.

The virtual volume ID field 2511 stores identifiers for identifying each of the virtual volumes 242 defined in the storage apparatus 200. The pool ID field 2512 stores identifiers for the pools 243 which are associated with the virtual volumes 242. The virtual page ID field 2513 stores identifiers for virtual pages, among the virtual pages in the virtual volumes, to which a real page has already been assigned. As mentioned earlier, the virtual pages are logical blocks in the virtual volumes and hence unique numbers (LBA) which are assigned to each of the logical blocks may also be stored as information for identifying the virtual pages. The real page ID field 2514 stores identifiers of real pages which are assigned to the virtual pages in the virtual volumes 242. Hence, in the case of FIG. 5, it can be seen that the virtual volume V01 is associated with a pool Pool0 and pages P11 to P14 have been assigned to virtual pages P01 to P04 respectively of the virtual volume V01.

The real page management table 252 is a table for managing the real pages provided by the storage device 230 and, as shown in FIG. 6, is configured from a pool ID field 2521, a pool volume ID field 2522, a real page ID field 2523, a Tier field 2524, a media type field 2525, a RAID group field 2526, a RAID level field 2527, and a LDEV field 2528.

The pool ID field 2521 stores identifiers of the pools 243 which are defined in the storage apparatus 200. The pool volume ID field 2522 stores identifiers of each of the pool volumes constituting the pools 243. The real page ID field 2523 stores identifiers of the real pages assigned to each of the real pages in the pools 243. The Tier field 2524 stores identifiers of each of the storage tiers defined in the pools 243. The media type field 2525 stores the types (SSD, SAS, and SATA and the like) of the storage devices 230 providing the pools 243. The RAID group field 2526 stores identifiers of RAID groups providing each of the storage tiers, and the RAID level field 2527 stores the RAID levels (RAID 5, RAID 1+0 and the like) of each of the RAID groups and RAID configurations (3D+1P, 2D+2D and the like). The LDEV field 2528 stores identifiers of storage areas (LDEV: Logical Devices) which are taken from a single pool 243 or a single pool volume which provide each of the storage tiers.

Hence, in the case of FIG. 6, it can be seen that a pool 243 known as POOL0 is configured from the pool volumes 244 V11 and V12, and the pages P11 to P13 are all pages which are assigned from the storage tier Tier 1 which is provided by an LDEV 0001. It can also be seen that the storage tier Tier 1 is provided by an SSD storage device 230, that the SSD storage device 230 constitutes a RAID group 1, the RAID level of the RAID group is RAID 5 and the RAID configuration is 3D+1P.

The other tables stored in the memory 214 will be illustrated in conjunction with a description of the processing of the virtual volume control program 250. First, a processing routine for the write processing which is executed by the virtual volume control program 250 will first be described. The virtual volume control program 250 starts the write processing upon receiving a data write request from the host computer 100 for the storage apparatus 200.

Figure 7:
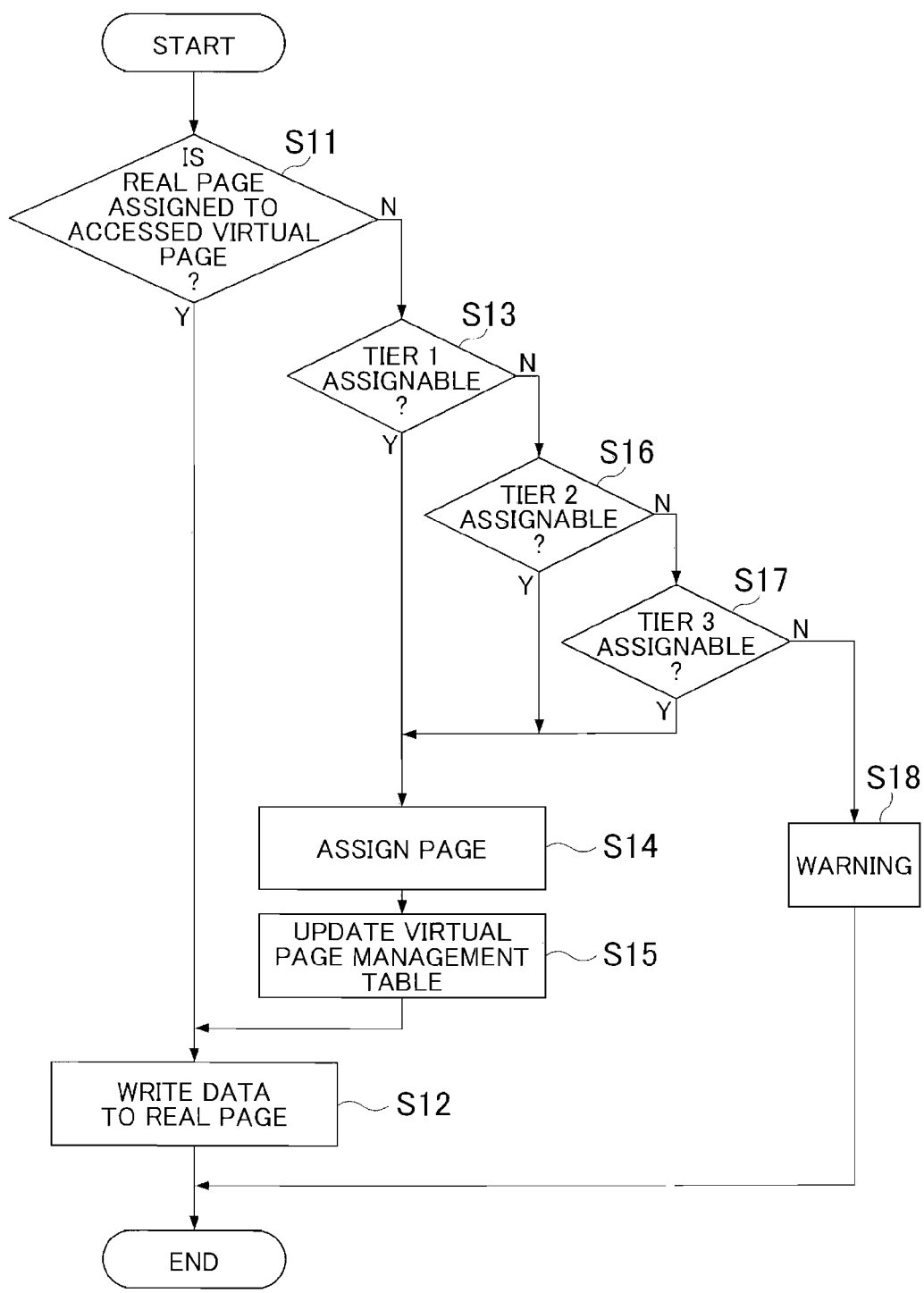
FIG. 7 is a flowchart showing a processing routine for write processing according to this embodiment.

As shown in FIG. 7, upon receiving the data write request from the host computer 100, the virtual volume control program 250 first determines whether a real page has been assigned to the virtual page accessed by the write request (S11). More specifically, the virtual volume control program 250 refers to the virtual page management table 251 and confirms whether the entry which corresponds to the virtual page accessed by the write request from the host computer 100 exists in the virtual page management table 251. If an identifier (virtual page ID) for the virtual page corresponding to the virtual page management table 251 exists in the virtual page management table 251, this indicates that a real page has been assigned to the virtual page and if no corresponding virtual page ID exists, this indicates that a real page has not been assigned to the virtual page.

If it is determined in step S11 that a real page has been assigned to the virtual page, the virtual volume control program 250 writes data to the real page (S12) and terminates the processing.

If, however, it is determined in step S11 that a real page has not been assigned to the virtual page, the virtual volume control program 250 determines whether a real page can be assigned from the storage tier Tier 1 (S13). More specifically, the virtual volume control program 250 acquires the maximum capacity and the assigned capacity of the storage tier Tier 1, calculates the assignable capacity of Tier 1 on the basis of the maximum capacity and the assigned capacity thus acquired, and determines whether it is possible to assign a real page from the capacity.

If it is determined in step S13 that a real page can be assigned from the storage tier Tier 1, the virtual volume control program 250 assigns a real page from the storage tier Tier 1 (S14) and updates the virtual page management table 251 (S15). The virtual volume control program 250 then writes data to the real page assigned from the storage tier Tier 1 (S12) and terminates the write processing.

If, however, it is determined in step S13 that a real page cannot be assigned from the storage tier Tier 1, the virtual volume control program 250 determines whether a real page can be assigned from storage tier Tier 2 (S16). More specifically, the virtual volume control program 250 acquires the maximum capacity and the assigned capacity of the storage tier Tier 2, calculates the assignable capacity of Tier 2 on the basis of the maximum capacity and the assigned capacity thus acquired, and determines whether it is possible to assign a real page from the capacity.

If it is determined in step S16 that a real page can be assigned from storage tier Tier 2, the virtual volume control program 250 assigns a real page from the storage tier Tier 2 (S14) and updates the virtual page management table 251 (S15). The virtual volume control program 250 then writes data to the real page assigned from the storage tier Tier 2 (S12) and terminates the write processing.

If, however, it is determined in step S16 that a real page cannot be assigned from the storage tier Tier 2, the virtual volume control program 250 determines whether a real page can be assigned from storage tier Tier 3 (S17). More specifically, the virtual volume control program 250 acquires the maximum capacity and the assigned capacity of the storage tier Tier 3, calculates the assignable capacity of Tier 3 on the basis of the maximum capacity and the assigned capacity thus acquired, and determines whether it is possible to assign a real page from the capacity.

If it is determined in step S17 that a real page can be assigned from storage tier Tier 3, the virtual volume control program 250 assigns a real page from the storage tier Tier 3 (S14) and updates the virtual page management table 251 (S15). The virtual volume control program 250 then writes data to the real page assigned from the storage tier Tier 3 (S12) and terminates the write processing.

If, however, it is determined in step S17 that a real page cannot be assigned from the storage tier Tier 3, the virtual volume control program 250 issues a warning to the effect that pages cannot be assigned from any of the storage tiers Tier 1 to Tier 3 (S18). More specifically, the virtual volume control program 250 issues a warning to the host computer 100 to the effect that data cannot be written to the virtual volume 242. The virtual volume control program 250 then terminates the write processing.

The read processing which is executed by the virtual volume control program 250 will be described next. The virtual volume control program 250 starts read processing upon receiving a data read request from the host computer 100 for the storage apparatus 200.

Figure 8:
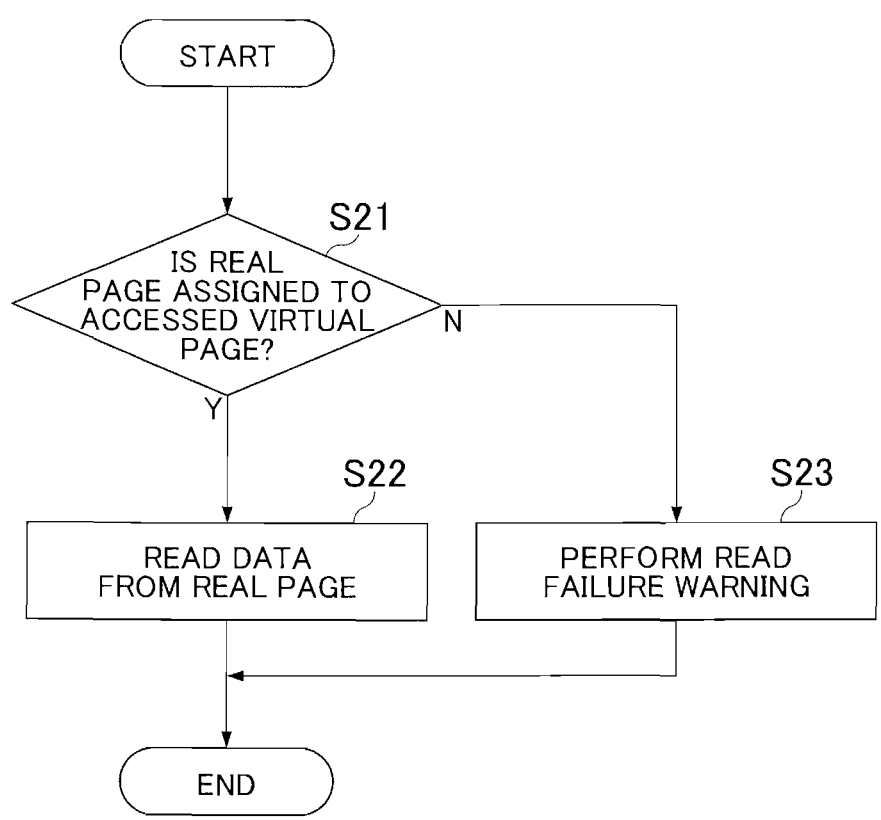
FIG. 8 is a flowchart showing a processing routine for read processing according to this embodiment.

As shown in FIG. 8, upon receiving a data read request from the host computer 100, the virtual volume control program 250 first determines whether a real page has been assigned to the virtual page accessed by the read request (S21). More specifically, the virtual volume control program 250 refers to the virtual page management table 251 and confirms whether the entry which corresponds to the virtual page accessed by the write request from the host computer 100 exists in the virtual page management table 251.

If it is determined in step S21 that a real page has been assigned to the virtual page, the virtual volume control program 250 reads data which is stored on the assigned real page (S22) and terminates the read processing.

If, however, it is determined in step S21 that a real page has not been assigned to the virtual page, the virtual volume control program 250 issues a warning to the effect that reading has failed to the host computer 100 (S23). The virtual volume control program 250 subsequently terminates the read processing.

The processing routine for Tier ratio adjustment processing which is executed by the virtual volume control program 250 of the storage apparatus 200 will be described next. The virtual volume control program 250 migrates a real page which is assigned to the virtual page on the basis of the frequency of access by the host computer 100 to the virtual page in the virtual volume 242 and the I/O characteristic and the like at regular or irregular intervals according to a schedule. Note that, strictly speaking, data is migrated between the storage tiers Tier 1 to Tier 3 but this does not mean that real pages are migrated between the storage tiers. As data is migrated between the storage tiers, the real pages storing this data are treated as if they were migrated. However, in order to express this more simply, the migration of data between the storage tiers is described more simply using an expression indicating that a real page is migrated between storage tiers.

Figure 9:
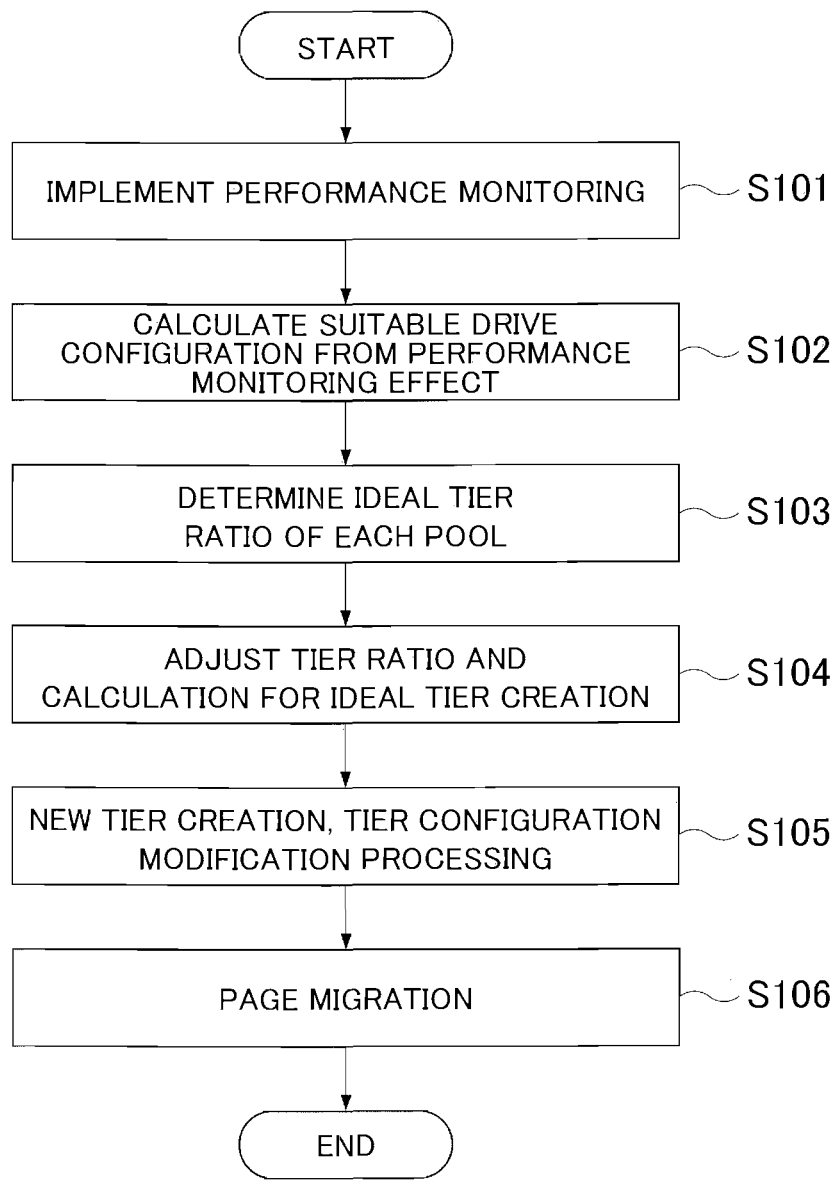
FIG. 9 is a flowchart showing a processing routine for Tier ratio adjustment processing according to this embodiment.

As shown in FIG. 9, the virtual volume control program 250 first carries out performance monitoring (S101). More specifically, the virtual volume control program 250 acquires the access frequency and I/O characteristic for each virtual page of the virtual volume and stores the acquired values in the performance monitoring table 253. In this embodiment, one real page of the pool 243 is assigned to a single virtual page in the virtual volume 242. The act of acquiring the performance for each real page therefore indicates the acquisition of the performance for each virtual page. For example, the virtual volume control program 250 acquires the access frequency per unit of time to the real pages assigned to each of the virtual pages of the virtual volume 242, the I/O characteristic for the real page, the read/write ratio, and the response time and the like, and stores these values in the performance monitoring table 253.

Here, the details of the performance monitoring table 253 will now be described. The performance monitoring table 253 is a table for managing various performance for the real pages assigned to the virtual pages in the virtual volume 242. As shown in FIG. 10, the performance monitoring table 253 is configured from a real page ID field 2531, an I/O characteristic field 2532, a read/write ratio field 2533, an access frequency field 2534, and a response time field 2535.

The real page ID field 2531 stores identifiers of the real pages assigned to the virtual pages in the virtual volume 242. The I/O characteristic field 2532 stores an indication of whether the I/O for each real page is a random I/O or a sequential I/O. The I/O characteristic for each real page is acquired by, for example, monitoring whether, within a real page, a continuous area is accessed by the host computer 100 or a discontinuous area is accessed. The read/write ratio field 2533 stores the ratio of the number of read commands and write commands from the host computer 100 for each of the real pages are stored. The access frequency field 2534 stores the frequency of access by the host computer 100 per unit of time to each real page. The response time field 2535 stores the time until a data read/write request for each real page is transmitted from the host computer 100 and the data targeted by the read/write request is transferred to the host computer 100.

Hence, in the case of FIG. 10, it can be seen that, for the real page P11, monitoring yields the following results, namely, the I/O characteristic is random, the read/write ratio is 50:50, the access frequency is 5, and the response time is 20 ms.

Furthermore, the virtual volume control program 250 manages the performance and Tier ratio and so on for each virtual volume 242 in the virtual volume management table 254. The virtual volume management table 254 is a table for managing the performance and Tier ratio and the like of the virtual volume to which the real pages are assigned on the basis of the monitoring results for each real page and a request from the application 110 of the host computer 100. As shown in FIG. 11, the virtual volume management table 254 is configured from a virtual volume ID field 2541, an access frequency field 2542, an I/O characteristic field 2543, a priority level field 2544, a required performance field 2545, and a Tier ratio field 2546.

The virtual volume ID field 2541 stores identifiers which identify each of the virtual volumes 242 defined in the storage apparatus 200. The access frequency field 2542 stores the access frequency in virtual volume units and stores, for example, the average value of the access frequency of the real page assigned to the virtual volume 242. The I/O characteristic field 2543 stores the I/O characteristic of each virtual volume 242. For example, if the I/O characteristics of the real pages assigned to the virtual volume 242 are all random, the I/O characteristic of the virtual volume 242 is random, if the I/O characteristics of the real pages assigned to the virtual volume 242 are all sequential, the I/O characteristic of the virtual volume 242 is sequential, and if the I/O characteristics of the real pages assigned to the virtual volume 242 include any of the characteristics random and sequential, the I/O characteristic of the virtual volume 242 is random.

The priority level field 2544 stores the priority level of each virtual volume 242, for example, the priority ranking of the application 110 of the host computer 100 which accesses the virtual volume 242. The required performance field 2545 stores the level of performance required for the virtual volume 242. The required performance for the virtual volume 242 is the required performance of the application 110 of the host computer 100 which accesses the virtual volume 242. The Tier ratio field 2546 stores the Tier ratio of each virtual volume 242 and stores the total value of the Tier ratios of the real pages assigned to the virtual volume 242.

Accordingly, the virtual volume control program 250 manages the performance and Tier ratio and the like for each virtual volume 242 in the virtual volume management table 254. In other words, the virtual volume control program 250 is able to manage the performance and Tier ratio for each of the applications 110 of the host computer 100 which accesses the virtual volume 242 using the virtual volume management table 254.

Returning to FIG. 9, the virtual volume control program 250 calculates the suitable drive configuration from the performance monitoring results stored in the performance monitoring table 253 (S102). More specifically, the virtual volume control program 250 refers to the drive performance rank table 255 on the basis of the access frequency and I/O characteristic acquired in step S101 and determines a suitable drive for each real drive.

The drive performance rank table 255 will now be described in detail. The drive performance rank table 255 is a table for managing the access frequency, I/O performance, and the types and performances and the like of the storage devices 230 in association with one another, and is pre-configured according to inputs from the system administrator or the like. As shown in FIG. 11, the drive performance rank table 255 is configured from a rank (priority ranking) field 2551, an TOPS field 2552, an I/O characteristic field 2553, a read/write ratio field 2554, a required performance field 2555, a suitable media type field 2556, a performance (rotational speed) field 2557, a RAID level field 2558, and a suitable Tier field 2559.

The rank (priority ranking) field 2551 stores information identifying the rank corresponding to each drive performance. The TOPS field 2552 stores the I/O count (IOPS: Input Output per second) which can be executed per second and which corresponds to each rank. The I/O characteristic field 2553 stores information, corresponding to each rank, indicating whether an I/O is a random I/O or a sequential I/O. The read/write ratio field 2554 stores the ratio of the number of read commands and write commands which correspond to each rank. The required performance field 2555 stores the performance rank requested by the host computer 100 and corresponding to each rank. The values stored in the required performance field 2555 may also be transmitted as flags indicating the required performance to the storage apparatus 200 by each application of the host computer 100, for example.

The suitable media type field 2556 stores suitable media types which correspond to each rank, and stores, for example, media types such as SSD, SAS disk or SATA disk. The performance (rotational speed) field 2557 stores the rotational speed of a SAS disk or SATA disk or other disk. The RAID level field 2558 stores the type of RAID level (RAID 5, RAID 1+0 and the like, for example) and the RAID configuration (3D+1P, 4D+4D, and so on, for example). Here, the D in a RAID configuration indicates data and P indicates parity. For example, 3D+1P indicates that three data and one parity are stored on an SSD or other storage medium. Furthermore, 4D+4D, for example, indicates that four legitimate data and four mirrored data are stored on an SSD or other storage medium. The suitable Tier field 2559 stores information, corresponding to each rank, which indicates the storage tier (Tier 1, Tier 2, and so on, for example).

Hence, in the case of FIG. 11, for example, rank 1 indicates that a real page for which IOPS is 500, the I/O characteristic is random, the read/write ratio is 50:50, and the required performance is high is configured from an SSD, and indicates that a tier Tier 1 with a RAID level of RAID 5 (3D+1P) is in an optimal placement location (drive).

Returning to FIG. 9, the virtual volume control program 250 determines the ideal Tier ratio for each pool (S103). More specifically, the virtual volume control program 250 determines the ideal Tier ratio for each pool on the basis of a suitable Tier which corresponds to a suitable drive for each real page calculated in step S102. The Tier ratio determination processing in step S103 will be described in detail subsequently.

The virtual volume control program 250 subsequently adjusts the Tier ratio for each pool 243 on the basis of the ideal Tier determined in step S103, and executes computational processing to create the ideal Tier (S104). More specifically, the virtual volume control program 250 creates a new Tier and calculates whether a change in the RAID level and RAID configuration is required so that the actual pool Tier ratio approximates the ideal Tier. In addition, the virtual volume control program 250 considers the real pages that have not yet been assigned to the virtual page and, after considering the addition of a new drive, or similar, adjusts the Tier ratio. The Tier ratio adjustment processing of step S104 will be described in detail subsequently.

The virtual volume control program 250 subsequently executes processing to actually create a new Tier or processing to modify the Tier configuration on the basis of the Tier ratio calculated in step S104 (S105). More specifically, in order to realize the Tier ratio adjusted in step S104, the virtual volume control program 250 changes the RAID configuration and adds a new drive to the pool 243. The new Tier creation processing and Tier configuration modification processing of step S105 will be described in detail subsequently.

Finally, the virtual volume control program 250 actually executes page migration processing (S106). As mentioned earlier, real page migration is implemented by migrating data stored on a real page and therefore the virtual volume control program 250 migrates data stored on the migration-target real page to the storage devices 230 constituting the Tiers determined in step S106. The page migration processing in step S106 will be described in detail subsequently.

(Tier Ratio Determination Processing)

Figure 13:
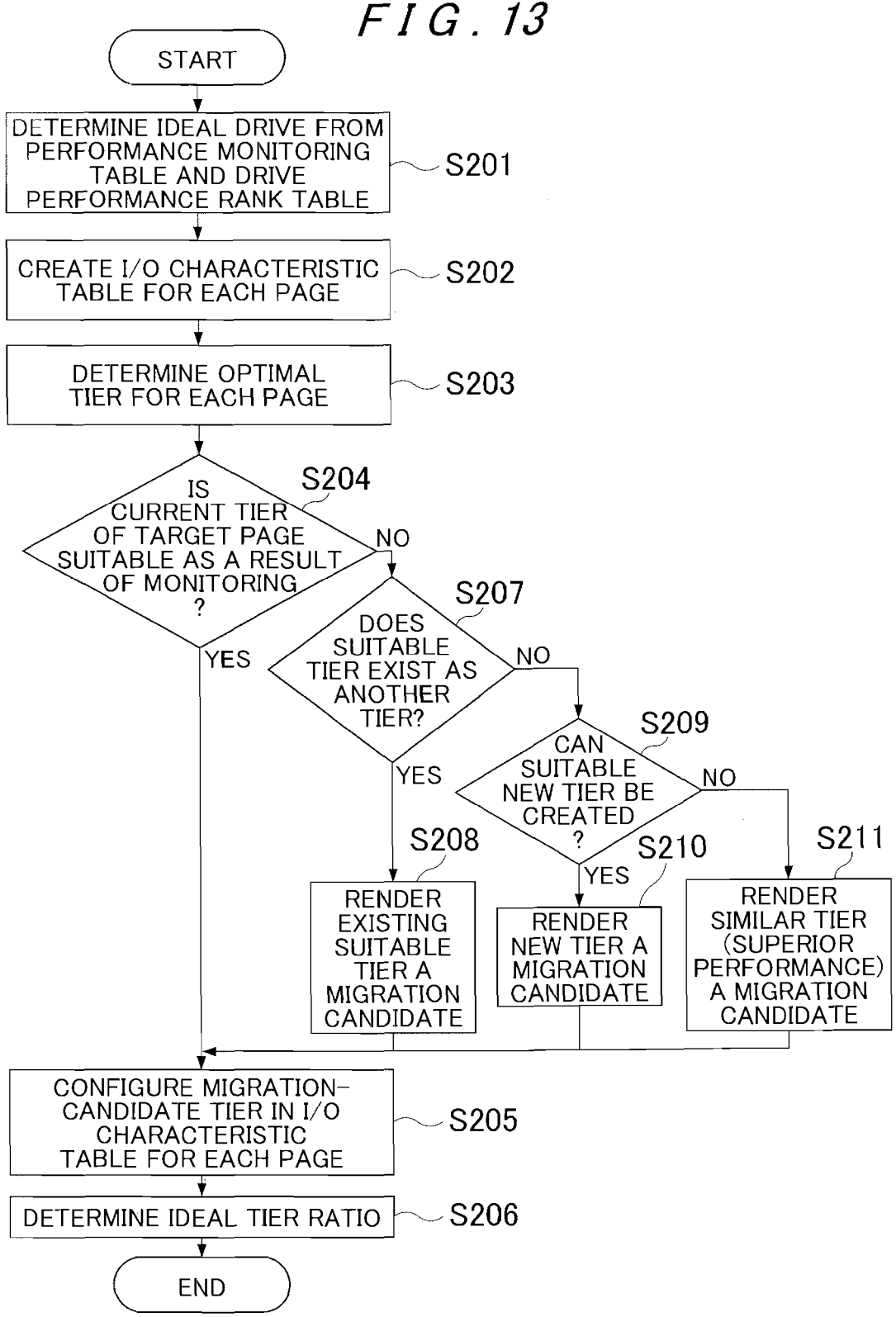
FIG. 13 is a flowchart showing a processing routine of a Tier ratio determination processing according to this embodiment.

A processing routine for Tier ratio determination processing which is executed by the virtual volume control program 250 in step S103 above will be described next. As shown in FIG. 13, the virtual volume control program 250 first determines the ideal drive from the performance monitoring table 253 and the drive performance rank table 255 (S201). More specifically, the virtual volume control program 250 extracts the drive (Tier) corresponding to the performance information stored in the performance monitoring table 253 from the drive performance rank table. For example, the virtual volume control program 250 selects rank 1 which is the closest to the performance in the drive performance rank table 255 in FIG. 12 based on the fact that, in the performance monitoring table 253 in FIG. 10, the real page P11 has a random I/O characteristic, the read/write ratio is 50:50, and the access frequency is 5. A drive for which the suitable media type corresponding to rank 1 is SSD and the RAID level is RAID 5(3D+1P) is the ideal drive and Tier 1 is extracted as the ideal Tier.

The virtual volume control program 250 then creates an I/O characteristic table 256 for each page (S202). More specifically, the virtual volume control program 250 stores information such as the ideal drive for each page in the I/O characteristic table 256 on the basis of a determination in step S201.

Details on the I/O characteristic table 256 will now be provided. The I/O characteristic table 256 is a table for managing the ideal drive and ideal Tier which are determined on the basis of the I/O characteristic for each real page and, as shown in FIG. 14, is configured from a real page ID field 2561, a virtual volume ID field 2562, a current Tier field 2563, a current drive field 2564, an ideal drive field 2565, a page migration requirement field 2566, and a migration candidate Tier field 2567.

The real page ID field 2561 stores identifiers for real pages which are assigned to the virtual pages in the virtual volume 242. The virtual volume ID field 2562 stores identification information of the assignment destination virtual volume 242 for each real page. The current Tier field 2563 stores information on the current Tier to which each real page belongs. The current drive field 2564 stores information on the current drive to which each real page belongs. The ideal drive field 2565 stores information on the ideal drive for each real page determined in step S201. The page migration requirement field 2566 stores information indicating whether migration is required for each real page. The migration candidate Tier field 2567 stores information on a suitable Tier for each real page which is determined by the processing of step S203 and subsequent steps.

Therefore, in the case of FIG. 14, it can be seen, for example, that the real page which has an real page ID of 1 is assigned to the virtual volume 242 which has a virtual volume ID of 1, that the current storage tier is Tier 1, the current drive is SSD, and the RAID level and configuration is RAID 5 (3D+1P), and the ideal drive is a SATA disk with a rotational speed of 15 Krpm, the RAID level and configuration is RAID (3D+1P), the migration candidate storage tier (Tier) is Tier 3, and the page migration requirement is migration required. That is, for the real page with a real page ID of 1, the current storage tier and the migration candidate storage tier are different, and hence this is a page which requires migration.

Returning now to FIG. 13, the virtual volume control program 250 determines a suitable Tier for each page (S203). More specifically, the virtual volume control program 250 determines a suitable Tier for the target page by referring to the drive performance rank table 255 from the ideal drive determined in step S201. The virtual volume control program 250 repeats the processing of step S204 and subsequent steps for each page.

The virtual volume control program 250 subsequently determines, as a result of monitoring, whether or not the current Tier of the target page is suitable (S204). More specifically, the virtual volume control program 250 determines whether there is a match between the suitable Tier determined in step S203 and the current Tier.

If it is determined in step S204 that the current Tier of the target page is suitable, [the virtual volume control program 250] executes the processing of step S205 and subsequent steps.

If, however, it is determined in step S204 that the current Tier of the target page is not suitable, the virtual volume control program 250 determines whether a suitable Tier indicated as a migration candidate Tier exists as another Tier (S207). More specifically, the virtual volume control program 250 refers to the hierarchical management table 257 and determines whether the optimal Tier exists is the current Tier.

Details of the hierarchical management table 257 will be described next. The hierarchical management table 257 is a table which manages the media types and RAID levels and so on of each of the storage tiers constituting the current pool 243 and, as shown in FIG. 15, is configured from a Tier number field 2571, a media type field 2572, a performance field 2573, a RAID level field 2574, a total capacity field 2575, and an assigned capacity field 2576.

The Tier number field 2571 stores information identifying storage tiers. The media type field 2572 stores media types constituting each Tier. The performance field 2573 stores the performance corresponding to each medium, for example, the disk rotational speed or the like. The RAID level field 2574 stores RAID level information and configuration information constituting each tier. The total capacity field 2575 stores the total capacity of each Tier. The assigned capacity field 2576 stores the assigned capacity of the virtual pages of the virtual volume 242 for each Tier.

Therefore, in the case of FIG. 15, it can be seen that the storage tier Tier 1 is defined in a storage area provided by SSD, a RAID 5 (3D+1P) RAID is configured by the SSD, the total capacity of Tier 1 is 1 TB, and the assigned capacity of the virtual volume 242 is 500 GB. For example, the virtual volume control program 250 determines whether Tier 3 exists in the hierarchical management table 257 if the migration candidate Tier is Tier 3.

Returning to FIG. 13, if it is determined in step S207 that a suitable Tier exists in the current Tier, the virtual volume control program 250 takes the existing suitable Tier as the migration candidate (S208). The virtual volume control program 250 then executes the processing of step S205 and subsequent steps.

If, however, it is determined in step S207 that a suitable Tier does not exist in the current Tier, the virtual volume control program 250 determines whether a new Tier which will serve as a suitable Tier can be created (S209). In step S209, the system administrator confirms, via the management computer 300, whether or not it is possible perform disk expansion and, if disk expansion is possible, the Tiers constituted by such disks may be taken as migration candidates.

If it is determined in step S209 that a new Tier which will serve as a suitable Tier can be created, the virtual volume control program 250 takes the new Tier as a migration candidate (S210). The virtual volume control program 250 then executes the processing of step S250 and subsequent steps.

If, however, it is determined in step S209 that a new Tier which will serve as a suitable Tier cannot be created, the virtual volume control program 250 takes a Tier that is similar to a suitable Tier as a migration candidate (S211). More specifically, if a suitable Tier does not exist in the hierarchical management table 257, the virtual volume control program 250 takes a higher performance Tier which is similar to the suitable Tier as a migration candidate Tier. For example, if Tier 3 is the suitable Tier and only Tier 1 and Tier 2 exist in the hierarchical management table 257, Tier 2, which is a higher performance Tier than Tier 3 and is similar to Tier 3, is taken as the migration candidate. The virtual volume control program 250 then executes the processing of step S250 and subsequent steps.

The virtual volume control program 250 subsequently configures the migration candidate Tier determined using the foregoing processing in the migration candidate Tier field 2567 in the I/O characteristic table 256 (S205). If it is determined in step S205 that the current Tier is optimal, the virtual volume control program 250 takes the migration candidate Tier as the current Tier.

The virtual volume control program 250 subsequently determines the ideal Tier ratio (S206). More specifically, the virtual volume control program 250 refers to the value stored in the current Tier field 2563 and the value stored in the migration candidate Tier field 2567 of the I/O characteristic table 256 and calculates the current Tier ratio and ideal Tier ratio for each pool 243. For example, the Tier ratio for each pool 243 can be calculated from the total number of real pages in the pool 243 and the total number of real pages in each storage tier. The virtual volume control program 250 stores the current Tier ratio and the ideal Tier ratio for each pool 243 in the Tier ratio management table 258.

The Tier ratio management table 258 is a stable which manages the Tier ratio of each pool 243 and, as shown in FIG. 16, is configured from a pool ID field 2591, a current Tier ratio field 2592, and an ideal Tier ratio field 2593. The pool ID field 2591 stores information identifying pools IDs in the storage apparatus 200. The current Tier ratio field 2592 stores the current Tier ratio for each pool. The ideal Tier ratio field 2593 stores the ideal Tier ratio for each pool.

Furthermore, the virtual volume control program 250 may also calculate the Tier ratio for each virtual volume 242. In this case, the virtual volume control program 250 calculates the Tier ratio for each virtual volume 242 from the total number of real pages which are assigned to the virtual pages in the virtual volume 242 and the total number of these real pages in each of the storage tiers. In addition, the virtual volume control program 250 stores the Tier ratio for each virtual volume 242 in the Tier ratio field 2546 in the virtual volume management table 254 in FIG. 11 above.

Figure 17:
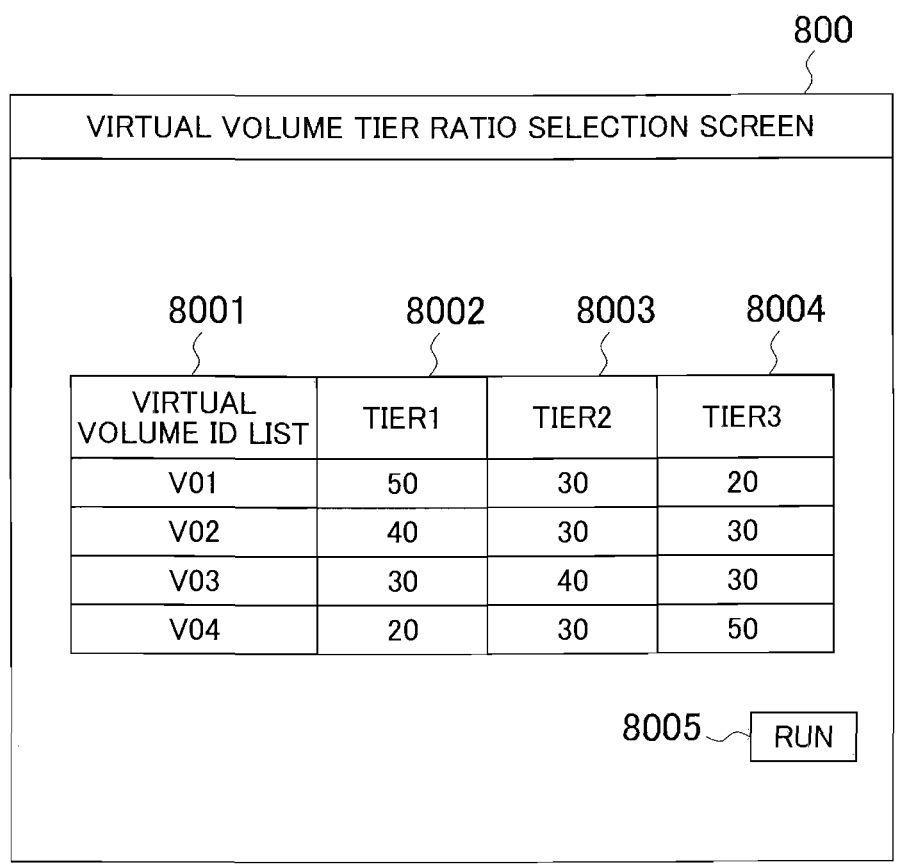
FIG. 17 is a conceptual diagram showing an example of a virtual volume Tier ratio selection screen according to this embodiment.

In addition, the Tier ratio for each virtual volume 242 may also be configured by the system administrator or the like via a virtual volume Tier ratio selection screen 850 which is displayed on the management computer 300. The virtual volume Tier ratio selection screen 850 is a screen which enables the system administrator to input the Tier ratio for each of the virtual volumes 242. As shown in FIG. 17, the virtual volume Tier ratio selection screen 850 comprises a virtual volume ID list field 8001, a Tier 1 field 8002, a Tier 2 field 8003, and a Tier 3 field 8004.

The virtual volume ID list field 8001 displays information identifying the virtual volumes 242 in the storage apparatus 200. The Tier 1 field 8002, Tier 2 field 8003, and Tier 3 field 8004 are fields enabling the system administrator to input the ratios of Tier 1, Tier 2, and Tier 3 for each virtual volume respectively. The Tier ratios are input by the system administrator and, as a result of the Run button 8005 being pressed, information on the Tier ratios of each of the virtual volumes is transmitted from the management computer 300 to the storage apparatus 200.

Returning to FIG. 13, after determining the ideal Tier ratio (S206), the virtual volume control program 250 terminates the Tier ratio determination processing.

(Tier Ratio Adjustment Processing)

Figure 18:
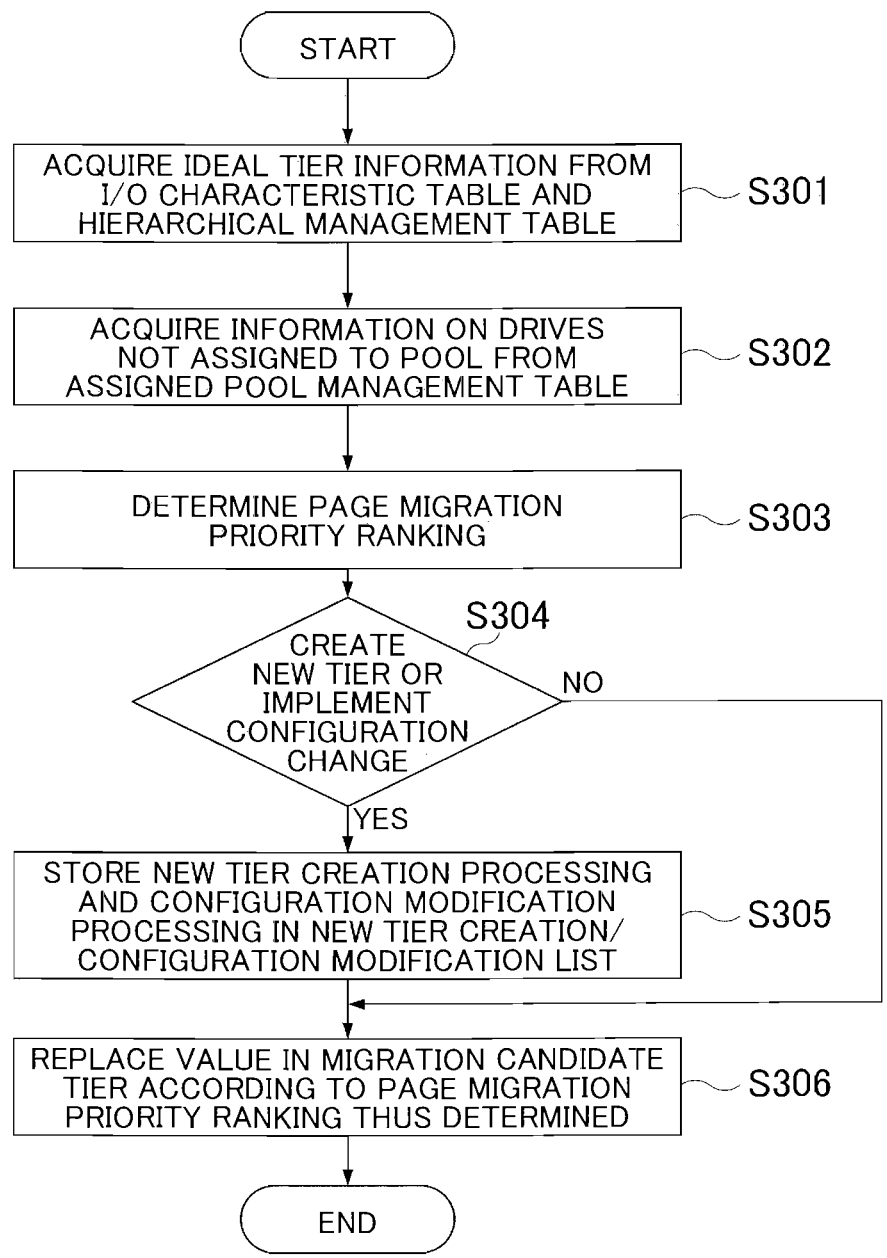
FIG. 18 is a flowchart showing a processing routine of a Tier ratio adjustment processing according to this embodiment.

The processing routine for the Tier ratio adjustment processing which is executed by the virtual volume control program 250 in the foregoing step S104 will be described next. As shown in FIG. 18, the virtual volume control program 250 first acquires information on the ideal Tier from the I/O characteristic table 256 and the hierarchical management table 257 (S301). More specifically, the virtual volume control program 250 acquires information on the migration candidate Tier (ideal Tier) in the I/O characteristic table 256 for each page, and acquires information on the RAID level, the total capacity, and the assigned capacity and the like which correspond to this Tier, from the hierarchical management table 257.

The virtual volume control program 250 subsequently acquires information on drives which have not yet been assigned to a pool 243 from the assigned pool management table 259 (S302).

The details of the assigned pool management table 259 will now be described. The assigned pool management table 259 is a table for managing information on the drives (storage devices) which are assigned to the pool 243 and, as shown in FIG. 19, is configured from a drive ID field 2601, an assigned pool field 2602, a drive type field 2603, a performance (rotational speed) field, and a capacity field 2605.

The drive ID field 2601 stores information identifying each of the storage devices. The assigned pool field 2602 stores information indicating whether each drive is assigned to a pool 243 and to which pool 243 each drive is assigned. The drive type field 2603 stores the type of each storage device. The performance (rotational speed) field stores performance information such as the rotational speed of each storage device. The capacity field 2605 stores the capacity of each storage device.

Therefore, in the case of FIG. 19, it can be seen, for example, that the storage device with the drive ID 01 is assigned to the pool 243 Pool 1, the drive type is an SAS drive, the rotational speed is 10 Krpm, and the capacity is 300 GB.

Returning to FIG. 18, the virtual volume control program 250 determines the priority ranking for page migration (S303). Here, the priority ranking for page migration is information indicating numbers for migrating pages for a plurality of pages requiring migration. For example, if the hierarchical difference between the current Tier and the ideal Tier is large, the page migration priority ranking is configured high, whereas if the hierarchical difference between the current Tier and the ideal Tier is small, the page migration priority ranking is configured low. Furthermore, the hierarchical difference between the current Tier and the ideal Tier is known as the rank, and the page migration priority ranking may also be determined on the basis of a preconfigured rank threshold. In addition, the page migration priority ranking may also be determined on the basis of prior items which are preconfigured by the input of a user such as the system administrator. The ranks indicating the foregoing hierarchical difference in Tier and the prior items are pre-configured and stored in the user configuration management table 260.

The user configuration management table 260 is a table for managing the prior items for determining the priority ranking for page migration and, as shown in FIG. 20, is configured from a configuration item field 2611 and a configuration value field 2612. The configuration item field 2611 stores various items which are configured by the user. The configuration value field 2602 stores configuration values for various configuration items. Therefore, in the case of FIG. 20, it can be seen that cost is configured as the prior item for page migration, for example. Therefore, when page migration is implemented, the page migration priority ranking is determined by considering costs as the highest priority. Furthermore, the rank threshold for the hierarchical difference during page migration is configured as 3. Hence, pages are migrated as a priority in cases where the hierarchical difference between the current Tier and the ideal Tier is 3.

Figure 21:
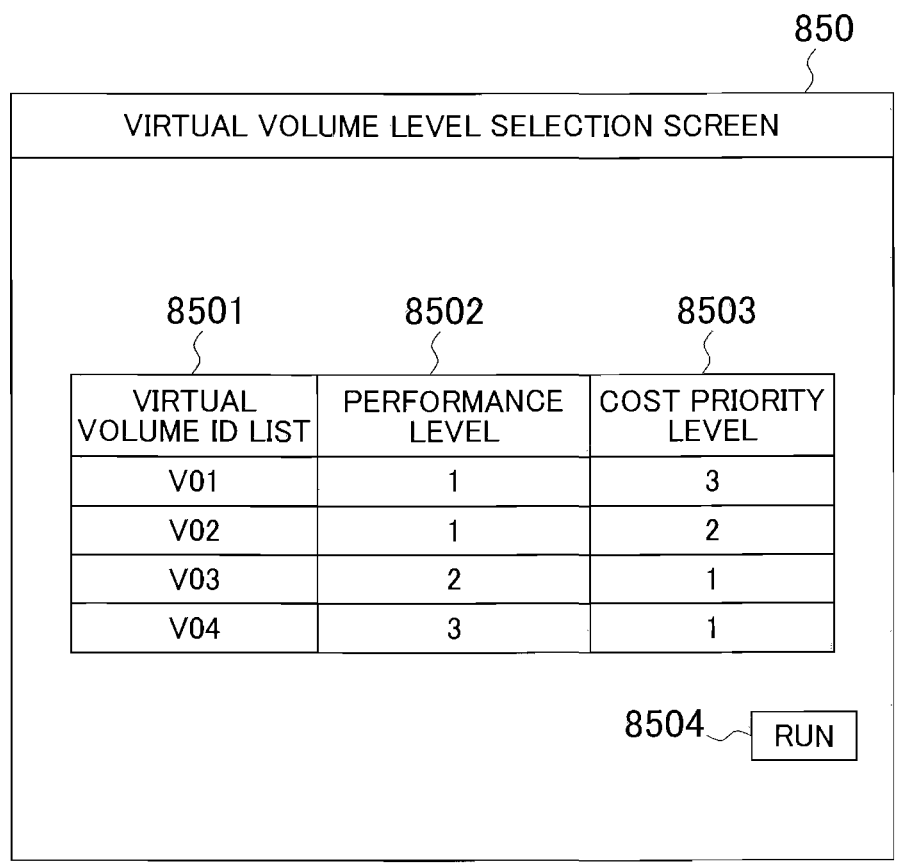
FIG. 21 is a conceptual diagram showing an example of a virtual volume level selection screen according to this embodiment.

Furthermore, the user configuration management table 260 may also be configured by the system administrator or the like via the virtual volume level selection screen 800 which is displayed on the management computer 300. The virtual volume selection screen 800 is a screen which enables the system administrator or the like to input the priority levels of the performance level and the costs for each of the virtual volumes 242. As shown in FIG. 21, the virtual volume level selection screen 800 comprises a virtual volume ID list field 8011, a performance level field 8012, and a cost priority level field 8013.

The virtual volume ID list field 8011 displays information identifying the virtual volumes 242 in the storage apparatus 200. The performance level field 8012 is a field which enables the system administrator to input the performance level of each virtual volume 242. The performance level is the level of performance requested by an application of the host computer 100 which accesses each virtual volume 242. In addition, the cost priority level field 8013 is a field which enables the system administrator to input the cost priority level of each virtual volume 242. The virtual volume control program 250 is able to refer to the performance level and cost priority level which are configured for each of the virtual volumes 242 to determine whether page migration is required for the real pages assigned to the virtual pages in the virtual volume 242 and determine the priority ranking for page migration.

Returning to FIG. 18, the virtual volume control program 250 determines, on the basis of the information on the ideal Tier acquired in step S301 and the information on drives not yet assigned to a pool which was acquired in step S302, whether it is necessary to create a new Tier or whether the Tier configuration must be modified (S304).

If it is determined in step 5304 that it is necessary to create a new Tier or that the Tier configuration must be modified, the virtual volume control program 250 stores the processing which is carried out in the new Tier creation/configuration modification processing list 270 (S305).

The new Tier creation/configuration modification processing list 270 stores the content of the processing which is executed in step S205 as shown in FIG. 22. It can be seen, for example, that if the list of processing content stores the "creation of a Tier 4 (the creation of RAID 1+0 (2D+2D) on four SSD drives which are drives 02, 05, 06, and 07)", a Tier 4 is newly created which is constituted by four SSD drives with the drive IDs 02, 05, 06, and 07, and with a RAID level 1+0 and a RAID configuration 2D+2D. It can also be seen that if the processing content list stores a "Tier 2 configuration modification (a modification of the RAID level of Tier 2 from RAID 6 (6D+2P) to RAID 5 (4D+1P))," the configuration of Tier 2 with a RAID level which is RAID 6 and a RAID configuration of 6D+2P is changed to a Tier 2 with a RAID level which is RAID 5 and a RAID configuration of 4D+1P.

If, however, it is determined in step S304 that there is no need to modify the Tier configuration and that a new Tier must be created, the virtual volume control program 250 executes processing of step S306 and subsequent steps.

The virtual volume control program 250 subsequently replaces the value of the migration candidate Tier field 2567 in the I/O characteristic table 256 according to the page migration priority ranking which is determined in step S303 (S306).

(New Tier Creation Processing, Tier Configuration Modification Processing)

Figure 23:
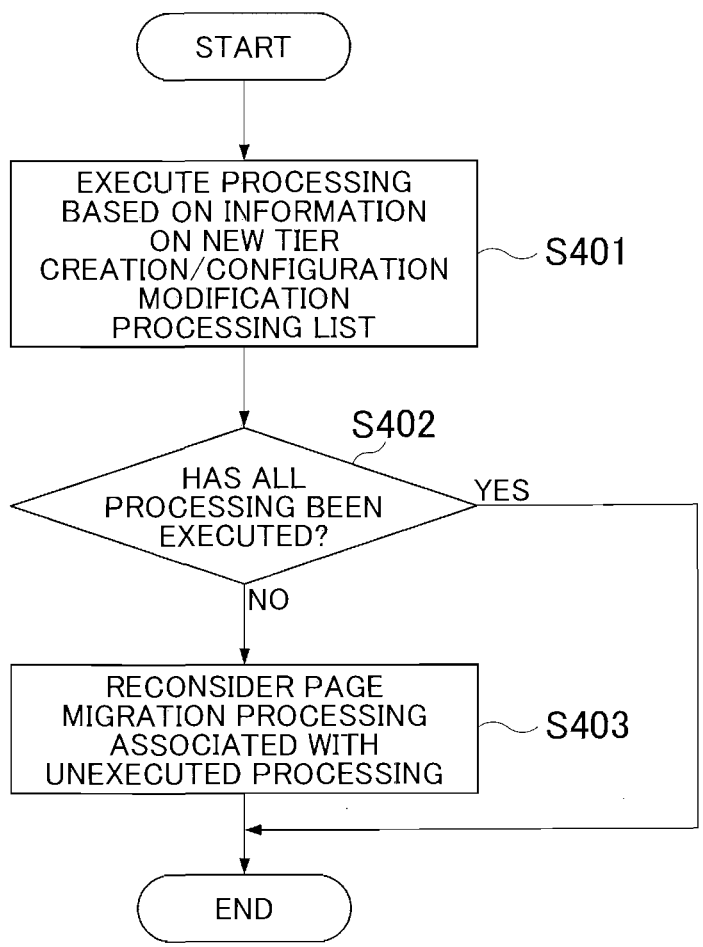
FIG. 23 is a flowchart showing a processing routine for new Tier creation processing and Tier configuration modification processing according to this embodiment.

A processing routine for the new Tier creation processing and the Tier configuration modification processing which are executed by the virtual volume control program 250 in the foregoing step S105 will be described next. As shown in FIG. 23, the virtual volume control program 250 first executes the processing in the storage apparatus 200 on the basis of information which is stored in the new Tier creation/configuration modification list 270 (S401). As mentioned hereinabove, the new Tier creation/configuration modification list 270 stores the content of the new Tier creation processing and Tier configuration modification processing.

Therefore, the virtual volume control program 250 sequentially executes the processing which is stored in the new Tier creation/configuration modification list 270. The virtual volume control program 250 creates, for example, a Tier 4, which is configured by RAID 1+0 (2D+2D) on four SSD drives which are drives 02, 05, 06, and 07, and modifies the configuration of Tier 2, which has a RAID level which is RAID 6 and a RAID configuration of 6D+2P, to a Tier 2 with a RAID level which is RAID 5 and a RAID configuration of 4D+1P.

The virtual volume control program 250 determines whether the processing which is stored in the new Tier creation/configuration modification processing list 270 has all been executed (S402).

If it is determined in step S402 that the processing which is stored in the new Tier creation/configuration modification processing list 270 has all been executed, the virtual volume control program 250 terminates the new Tier creation processing and Tier configuration modification processing.

If, however, it is determined in step S402 that not all of the processing which is stored in the new Tier creation/configuration modification processing list 270 has been executed, the virtual volume control program 250 reconsiders the page migration processing for the pages which are associated with processing that has not been executed (S403). A case where not all the processing stored in the new Tier creation/configuration modification processing list 270 has been executed in step S402 is, for example, a case where there is insufficient unused capacity in the migration destination Tier. In this case, the virtual volume control program 250 secures capacity for the migration-destination Tier by adding a new storage device and newly creating a Tier for migrating pages, or by creating a RAID configuration which is different from the existing Tier in order to improve the performance of the existing Tier, and executes page migration processing. The reconsideration of the page migration processing of the virtual volume control program 250 will be described in detail subsequently.

(Page Migration Processing)

Figure 24:
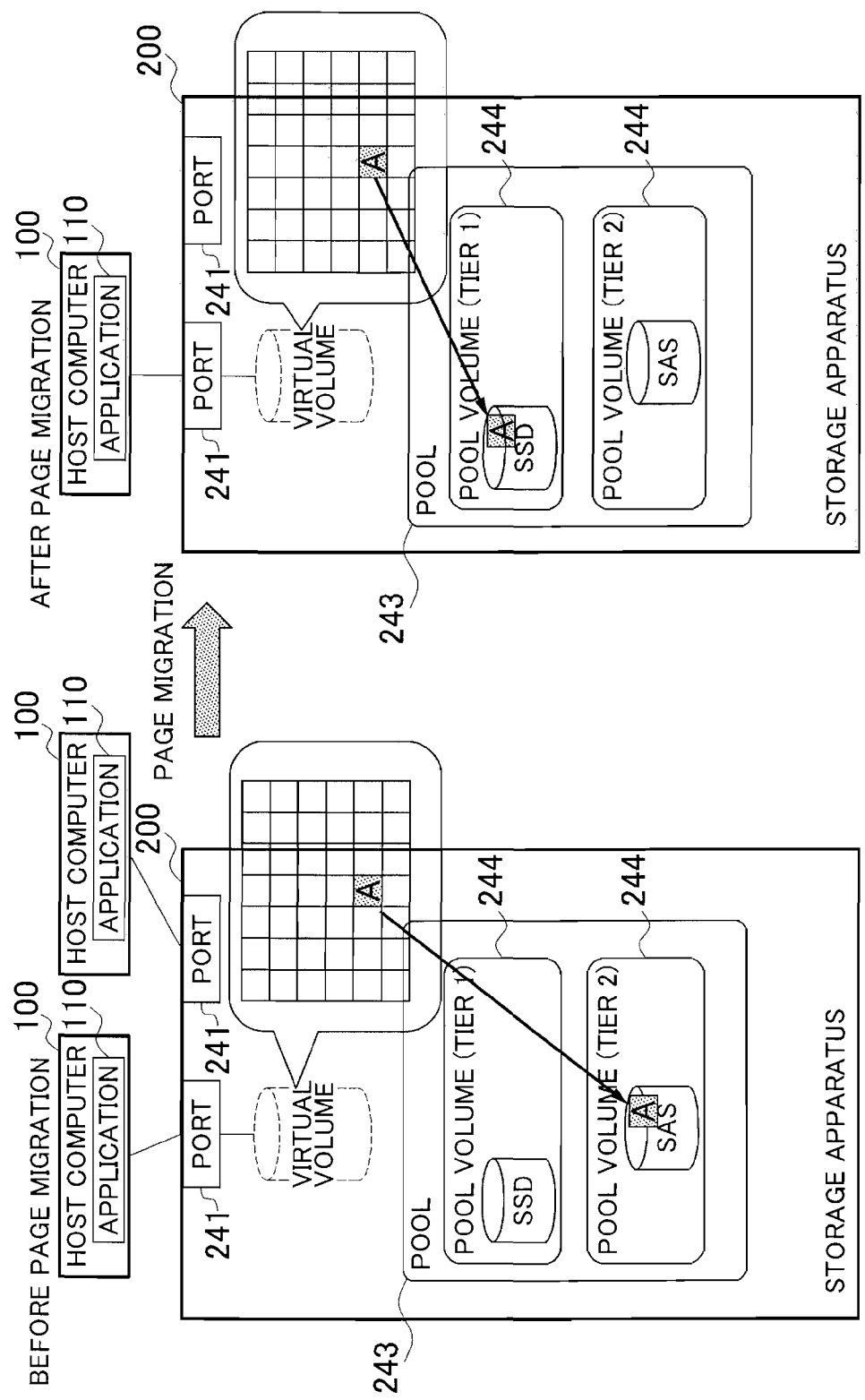
FIG. 24 is a flowchart showing a processing routine for page migration processing according to this embodiment.

The page migration processing which is executed by the virtual volume control program 250 in the foregoing step S106 will be described next. The page migration processing will be described by referring to a conceptual diagram of the page migration processing shown in FIG. 24. As mentioned earlier, the migration of real pages between Tiers is realized by migrating data which is stored on real pages between the Tiers. As shown in FIG. 24, data A, which is stored on an SAS disk which constitutes a pool volume 244 of Tier 2 prior to page migration is stored to an SSD which constitutes a pool volume 244 of Tier 1 as a result of page migration processing. Accordingly, the virtual volume control program 250 executes real page migration processing by migrating data which is stored on a migration target real page between storage devices constituting the Tiers.

With this embodiment, a real page which is assigned to the virtual volume 242 can be disposed in a suitable Tier not only according to the I/O performance such as the access frequency but also the I/O characteristic. In a case where the I/O characteristic for the virtual volume 242 varies greatly due to operational changes to the system or there is a large change in the required application performance, a real page can be placed in the optimal Tier in order to further improve the performance of the whole system.

(Processing to Reconsider Page Migration)

The processing to reconsider the page migration which is executed in cases where there is insufficient unused capacity in the migration-destination Tier will be described next. If the real page migration destination is determined, by means of the processing of steps S101 to S105 shown in FIG. 9, to be the top Tier and there is insufficient unused capacity in this migration-destination top Tier, the following two methods may be considered.

(A) A new storage device is added and a top Tier is newly created.

(B) A RAID configuration which differs from the existing Tier is created.

The processing in (B) adds a number of data disks (D) if there are a plurality of disks constituting the RAID, for example. A Tier above the existing Tier can accordingly be created.

Figure 25:
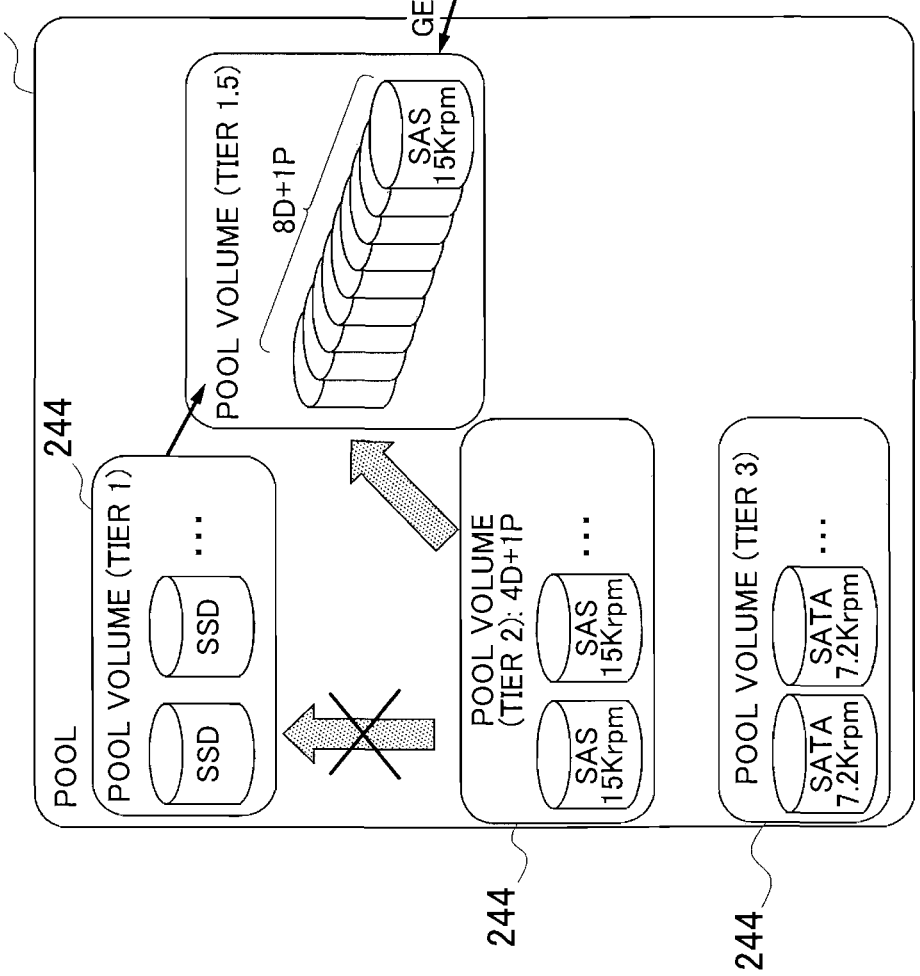
FIG. 25 is a conceptual diagram illustrating RAID configuration modification according to this embodiment.

For example, as shown in FIG. 25, if the determination is made that a real page in a Tier 2 pool volume 244 should be migrated to a Tier 1 pool volume 244, this is considered to be a case where there is insufficient unused capacity in Tier 1. Furthermore, if the storage devices (SAS) constituting the existing Tier 2 include a storage device (drive) which has not yet been assigned to the virtual volume 242, a storage tier with a higher performance than Tier 2 can be created by using the unused drives. If, for example, the current Tier 2 RAID configuration is 4D+1P, a storage tier with a higher performance than Tier 2 (this storage tier is called Tier 1.5) is created, i.e. the RAID configuration is made 8D+1P. A real page with a low required performance among the real pages disposed in the current Tier 1 is then migrated to the newly created Tier 1.5 and the real page which is to be migrated from Tier 2 to Tier 1 is migrated to Tier 1. By modifying the RAID configuration in this way, the existing storage devices can be effectively utilized while the performance of the overall system can be improved.

Figure 26:
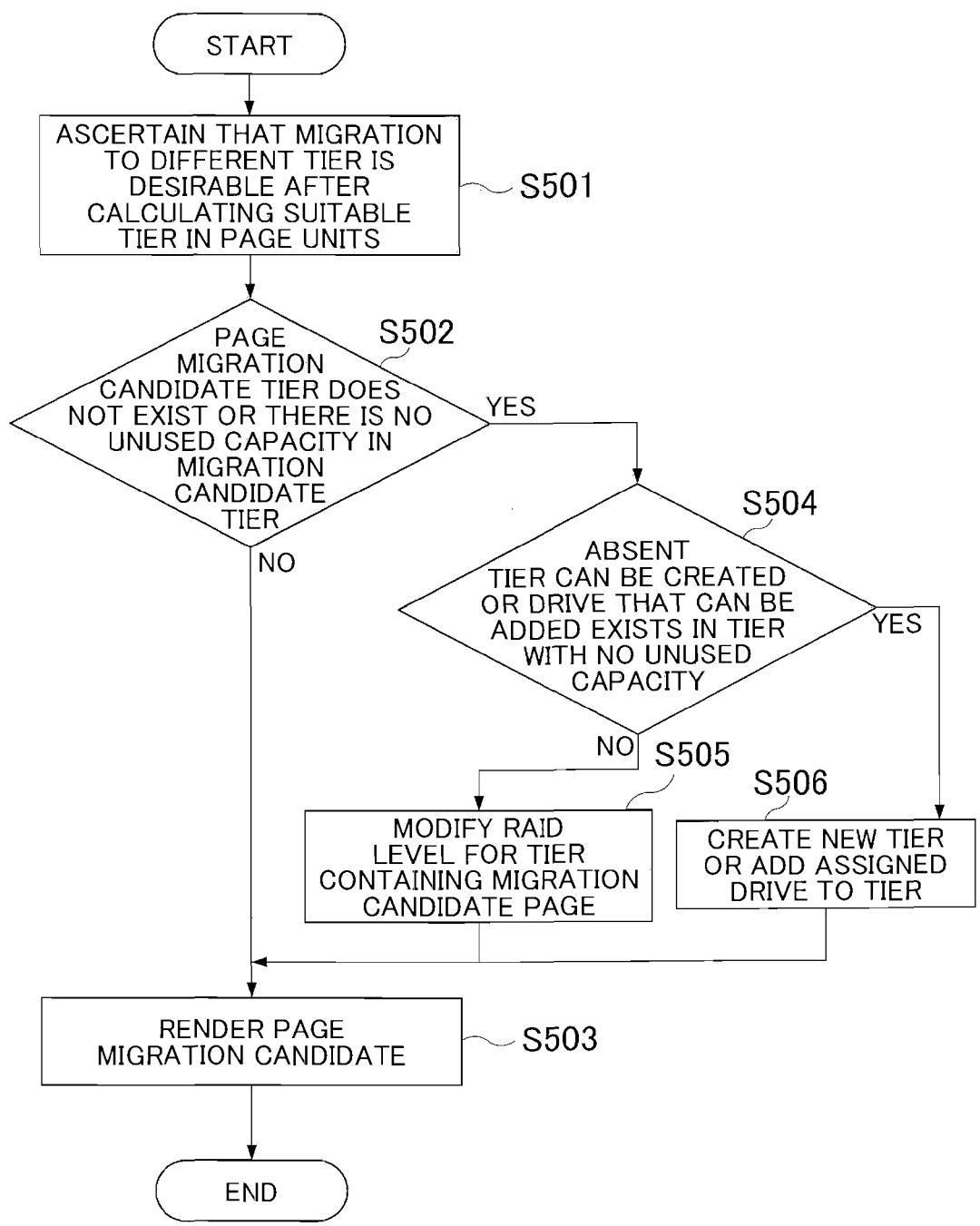
FIG. 26 is a flowchart showing a processing routine for RAID configuration modification processing according to this embodiment.

The processing routine for the RAID configuration modification processing which is executed by the virtual volume control program 250 will be described next. As shown in FIG. 26, if it is ascertained (S501) that migration to a different Tier is desirable after the optimal Tier is calculated in real page units by the processing of steps S101 to S105 shown in FIG. 9, the virtual volume control program 250 first determines whether there is no real page migration candidate Tier or whether there is no unused capacity in the migration candidate Tier (S502). When it is determined whether there is unused capacity in the page migration candidate Tier, it is assumed that the storage device is of the same type as the storage device constituting the Tier and Tiers with different RAID levels are also included.

If, in step S502, a page migration candidate Tier exists or there is unused capacity in the migration candidate Tier, the virtual volume control program 250 configures this Tier as a page migration destination candidate (S503) and terminates the processing. If, for example, the migration destination of the real page disposed in Tier 2 and there is sufficient unused capacity in Tier 1, the virtual volume control program 250 makes the real page migration destination Tier 1.

If, however, a page migration candidate Tier does not exist, or a migration candidate Tier exists but there is no unused capacity in the Tier, the virtual volume control program 250 determines whether the absent Tier can be created or whether there are drives (storage devices) which can be added to the Tier of insufficient capacity (S504). For example, if the migration destination of the real page disposed in Tier 2 is Tier 1 and Tier 1 does not exist, or if there is insufficient unused capacity in Tier 1, the virtual volume control program 250 determines whether Tier 1 can be created by adding a new SSD which is to constitute Tier 1 or whether the capacity of Tier 1 can be expanded.

If it is determined in step S504 that the absent Tier cannot be created or that there are no drives (storage devices) which can be added to the Tier with no unused capacity, the virtual volume control program 250 modifies the RAID level of the Tier which contains the migration candidate real page (S505). [The virtual volume control program 250] then configures the Tier with the RAID level that was changed in step S505 as the page migration-destination candidate (S503) and terminates the processing. The modification of the RAID level of the Tier in step S505 will be described in detail subsequently.

If, however, it is determined in step S504 that the absent Tier can be created or there are drives which can be added to the Tier with no unused capacity, the virtual volume control program 250 creates a new Tier and adds an unassigned drive to the Tier (S506). The virtual volume control program 250 then configures the Tier newly created in step S506 or the Tier to which the unassigned drive was added as the page migration destination candidate (S503) and terminates the processing.

Figure 27:
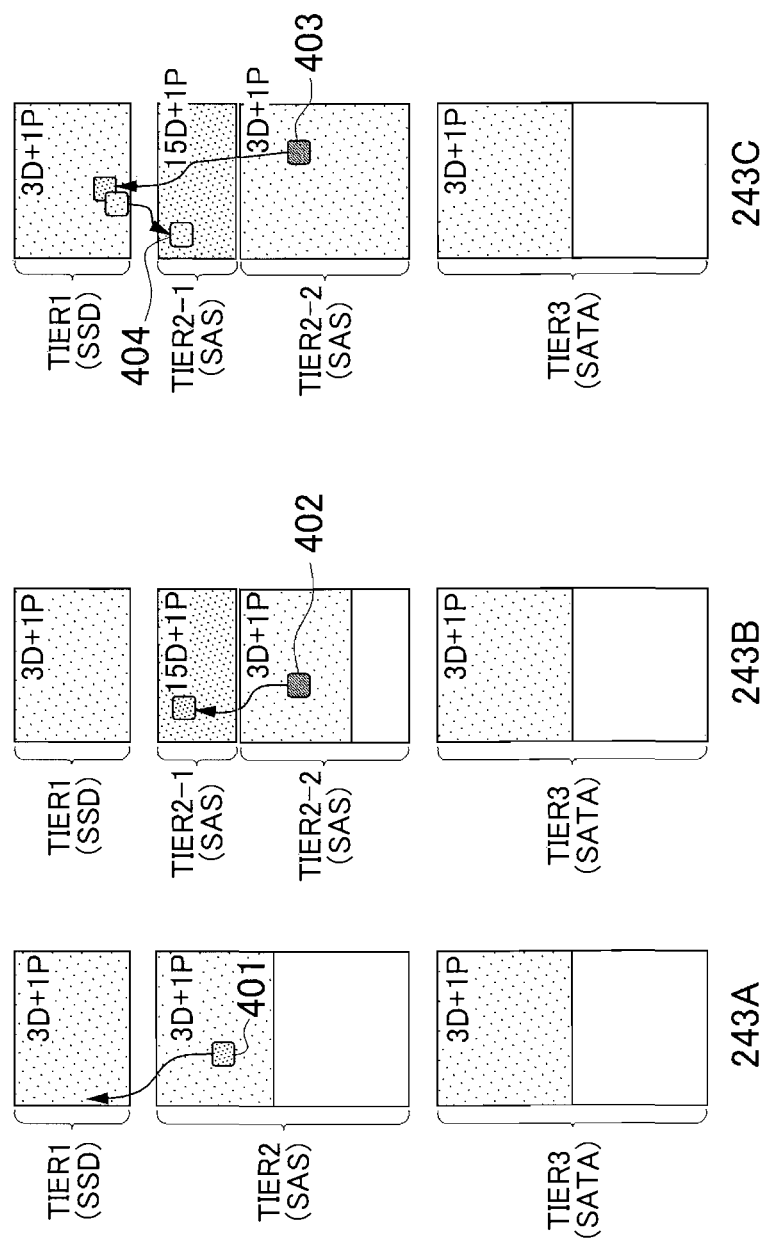
FIG. 27 is a conceptual diagram illustrating Tier configuration in the pool according to this embodiment.

A specific example of processing to modify the RAID level of the Tier in the foregoing step S505 will be described next. FIG. 27 is a conceptual diagram illustrating the configuration of the Tiers of pool 243. In FIG. 27, the state of the pool 243 prior to modifying the Tier RAID level is denoted pool 243A, and the state of the pool 243 after modifying the Tier RAID level is denoted pool 243B or pool 243C.

The pool 243A includes a Tier 1 pool volume 244 which is configured from SSD, a Tier 2 pool volume 244 which is configured from SAS, and a Tier 3 pool volume 244 which is configured from SATA. Furthermore, the RAID configurations are 3D+1P for Tier 1, 3D+1P for Tier 2, and 3D+1P for Tier 3 respectively. The utilization of Tier 1 is 100%, the utilization of Tier 2 is 40%, and the utilization of Tier 3 is 40%. If, for example, the optimal migration destination of data 401 which is stored in Tier 2 is Tier 1, because Tier 1 has no unused capacity, the data 401 cannot be migrated from Tier 2 to Tier 1.

Therefore, according to this embodiment, a RAID group which differs from the current RAID group is created from an unused storage device which is prepared as a storage device constituting Tier 2 and assigned to pool 243. In other words, as shown in pool 243B in FIG. 27, if the RAID configuration of the existing Tier 2 is 3D+1P, a RAID group with a RAID configuration which is 15D+1P is newly created and this RAID group is assigned to the pool 243B as a Tier 2-1. The existing Tier 2 is then made Tier 2-2. The newly created Tier 2-1 is a Tier with a higher performance than the existing Tier 2-2. Hence, any performance shortfall for the data 402, which requires migration from Tier 2 to Tier 1, can be eliminated by migrating the data 402 to Tier 2-2.

Accordingly, even if the unused capacity of the migration-destination storage tier is insufficient, the performance can be improved by using the existing resources. Although the RAID configuration of Tier 2-1 is 15D+1P above, the embodiment is not limited to this example, rather, the RAID configuration may also be modified to meet the performance required of the real page. Furthermore, although a new Tier is created by modifying the RAID configuration in the foregoing [description], a new Tier with a different performance from the existing Tier may also be created by modifying the RAID level.

In addition, if data 403 must be migrated from Tier 2 to Tier 1 as shown in pool 243C, consideration may also be paid to migrating data 404, which has a small access count among the data stored in Tier 1, to Tier 2-1. After migrating the data 404 from Tier 1 to Tier 2-1, the data 403 is migrated to an unused area of Tier 1. Any performance shortfall of the system can be minimized in comparison with a case where data is migrated from Tier 1 to the existing Tier 2.

Furthermore, although a case where an unused storage device is assigned to the pool 243 was exemplified in the foregoing description, the present embodiment is not limited to this example, rather, data in the existing Tier 2 may also be aggregated to secure unused area in the Tier 2 and this unused area may be used to create a new Tier.

In addition, if, for example, the operation or the like is modified and Tier 2-1 shown in pool 243B or 243C in FIG. 27 is unnecessary, the real page disposed in Tier 2-1 may be migrated to another Tier and the initial Tier configuration may be restored. Accordingly, with this embodiment, the configuration of the Tier can be fluidly modified in keeping with the operating state.

The ease with which a plurality of storage tiers are created in a computer system which manages data using a plurality of storage tiers increases the frequency of data migration and the performance of the processor is likely adversely affected by tier migration. Hence, in a normal operation, an operation using a certain number of tiers is desirable, and if a problem arises with the performance due to a temporary increase in the number of accesses, or the like, a new storage tier is desirably created by using this embodiment. The system administrator is accordingly able to cope with deterioration in performance without being aware of a resource deficiency.

Furthermore, as mentioned hereinabove, the storage tier performance can be improved by increasing the number of storage devices as when changing the RAID configuration from 3D+1P to 15D+1P, but this is disadvantageous in that the rate of failure increases. Hence, although there are problems with performance, this embodiment can be used more efficiently by coping with performance deterioration generally by modifying the RAID configuration, as in a case where a new storage device cannot be immediately added.

(3) Effects of the Embodiment

As described hereinabove, according to this embodiment, performance information such as the access frequency and I/O characteristic are monitored in the units of the real pages which are assigned to virtual pages of the virtual volume 242, the storage tiers where the real pages are disposed are determined based on the performance information thus monitored, and the Tier ratio for each virtual volume 242 is calculated. In addition, the Tier ratio is calculated by also considering the required performance of the application which accesses the virtual volume 242 and the required performance which is designated by the system administrator via the management computer 300.

Accordingly, a more suitable Tier ratio can be calculated than when the Tier ratio is calculated using the access frequency alone, and it is possible to construct a system with which the overall apparatus performance and user convenience are improved.

(4) Further Embodiments

In the foregoing, a method was described in which the effect when real pages are migrated is calculated from the actual performance data of real pages disposed in a plurality of storage tiers, the real pages are migrated by considering the required application performance and costs, and the required storage device is added and assigned to the pool 243. The present invention is not limited to this example, rather, the configuration of the storage apparatus 200 may also be designed on the basis of a preconfigured Tier ratio.

For example, the total capacity and ratio of the pool 243 may also be configured according to the design policy of the pre-configured storage apparatus 200. The design policy is configured according to the costs and performance and the like which are pre-configured by the system administrator. Conventionally, technology has been disclosed with which the Tier ratio in the pool 243 is determined by designating the total capacity of the pool 243 and the design policy beforehand.

However, the storage systems of recent years have been used in various ways such as for use in cloud computing or when a plurality of users use a plurality of applications according to an optional schedule. In this usage environment, it is thought that simply determining the Tier ratio according to the design policy does not make it possible to adapt to the actual operation, and obtaining an ideal result is not possible. Designing the configuration of the storage apparatus 200 which is suited to the actual operation by means of the following method may be considered. In other words, the designation of scheduled applications which are run on the storage apparatus 200 and requirements such as the assumed scale of operation and required performance and the like of the applications, and so on are captured as elements when configuring and designing the job schedule of the applications, and the Tier ratio is designed by simulating the operation in an actual environment on the basis of these configuration and design elements. This will be described in specific terms hereinbelow.

Figure 28:
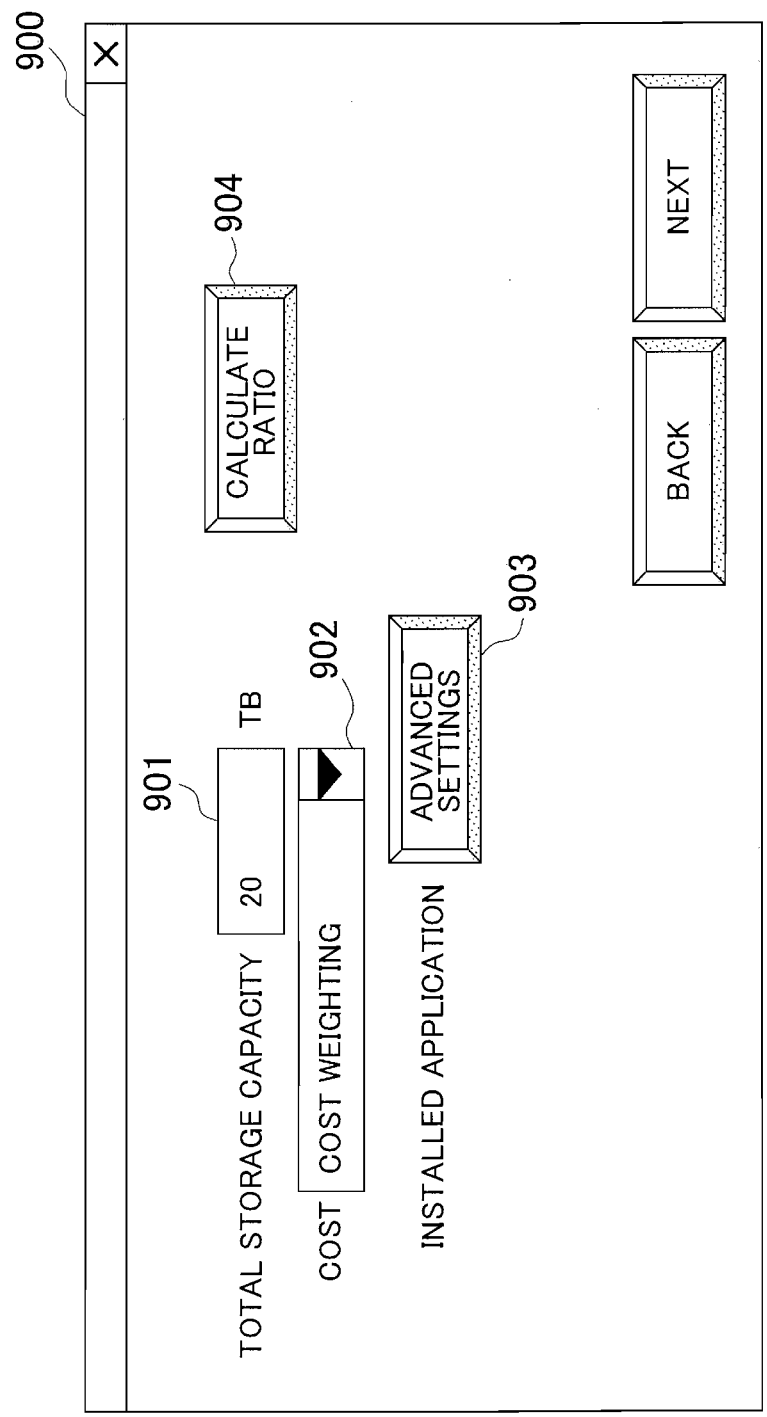
FIG. 28 is a conceptual diagram showing an example of a Tier ratio computation screen according to another embodiment.

For example, as shown in FIG. 28, the total storage capacity (pool size) is first input by the system administrator to the total storage capacity input field 901 via a Tier ratio calculation screen 900 which is displayed on the management computer 300. The total storage capacity is the capacity obtained by totaling the capacities of each of the storage tiers in the pool 243 and is the total capacity required by the user using the storage apparatus. A policy relating to costs is then input to the cost input field 902 by the system administrator. For example, any item among the selection items of cost weighting, performance weighting, and balance weighting is selected via the cost input field 902.

Figure 29:
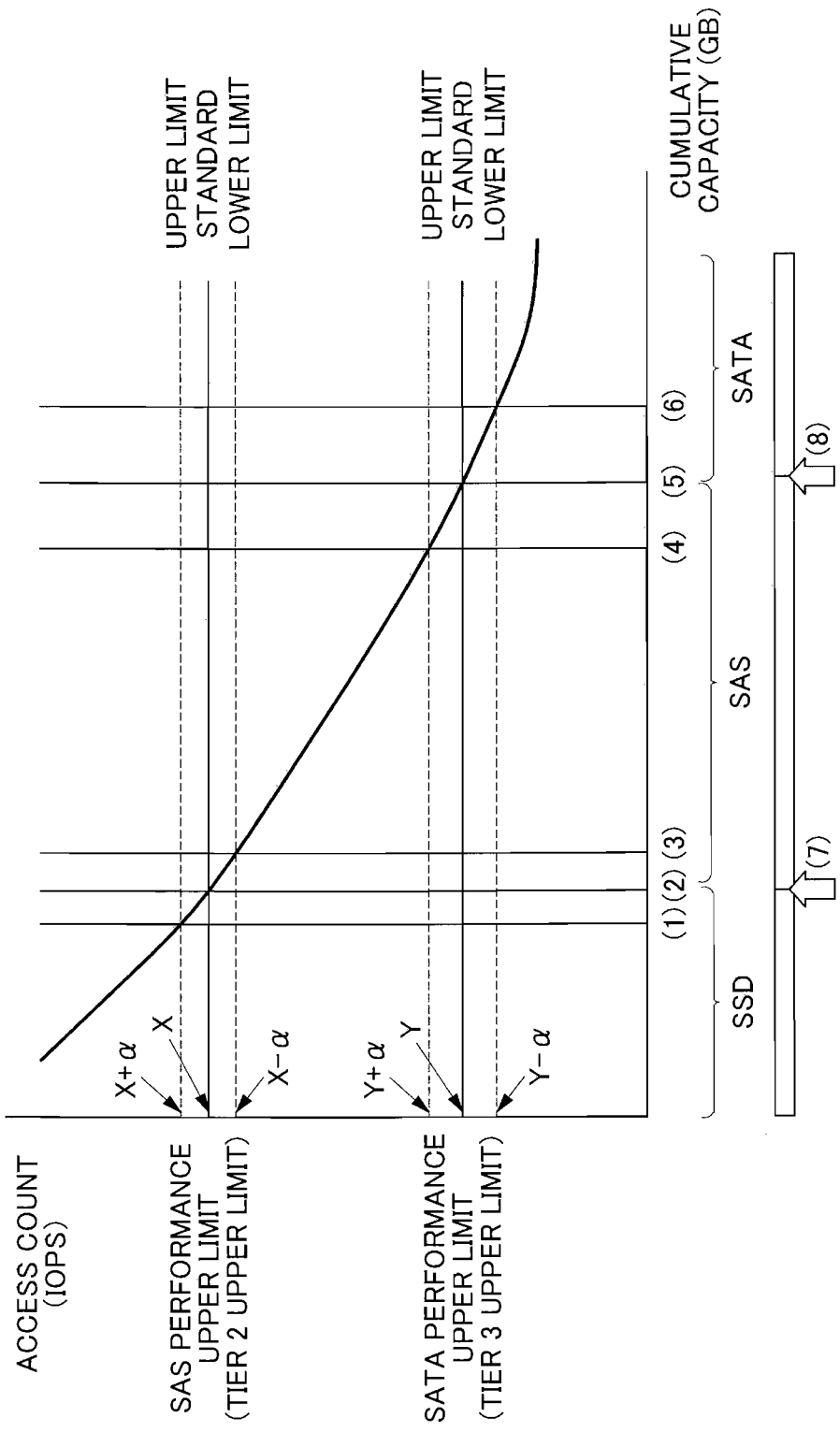
FIG. 29 is a graph showing an access count data distribution diagram according to this embodiment.

Here, how the policy relating to costs which is selected using the cost input field 902 affects the Tier ratio calculation will now be described. FIG. 29 is a data distribution diagram for access counts which are collected from sample data. For example, suppose that a performance upper limit value exists for each Tier. For example, if Tier 2 is configured from SAS disks, a standard performance upper limit value indicated by X in FIG. 29 exists for Tier 2. In reality, the performance upper limit value comprises a predetermined width and, as shown in FIG. 29, there is an upper limit (X+a) and a lower limit (X−a). Furthermore, if Tier 3 is configured by SATA disks, a standard performance upper limit indicated by Y in FIG. 29 exists in Tier 3. In reality, the performance upper limit has a predetermined width and, as shown in FIG. 29, there is an upper limit (Y+a) and a lower limit (Y−a).

In the case where the Tier ratio is calculated by the sample data shown in FIG. 29, suppose that the data cumulative capacity above line X represents the capacity of Tier 1, for example. In addition, suppose that the data cumulative capacity between lines X and Y represents the capacity of Tier 2.

Also suppose that the data cumulative capacity below line Y represents the capacity of Tier 3. Furthermore, if the aforementioned cost-related policy is designated, the Tier ratio is calculated based on the designated policy. For example, if cost weighting is selected as the cost-related policy, the ratio for each of the storage devices is calculated from the distribution diagrams at (1) and (4) in FIG. 29. In addition, if performance weighting is selected as the cost-related policy, the ratio for each of the storage devices is calculated from the distribution diagrams at (3) and (6) in FIG. 29. Furthermore, if balance weighting is selected as the cost-related policy, the ratio for each of the storage devices is calculated from the distribution diagrams at (2) and (4) in FIG. 29.

In addition, by displaying the ratio boundary lines (1), (2), (3), and (4), (5), (6) in FIG. 29 on the display screen of the management computer 300 and designating ratio boundary lines (7) and (8), it is possible to visually grasp whether the required performance has been met or how much data that does not meet performance exists. For example, since not all the data in the storage device is accessed simultaneously, if the proportion of data not meeting the required performance is less than 10%, it is determined that the required performance can actually be met by frequently performing data migration between tiers and the ratio boundary lines can be adjusted.

Furthermore, the system administrator calculates the Tier ratio by taking into consideration the actual storage device introduction costs, power consumption, and performance and the like.

Figure 30:
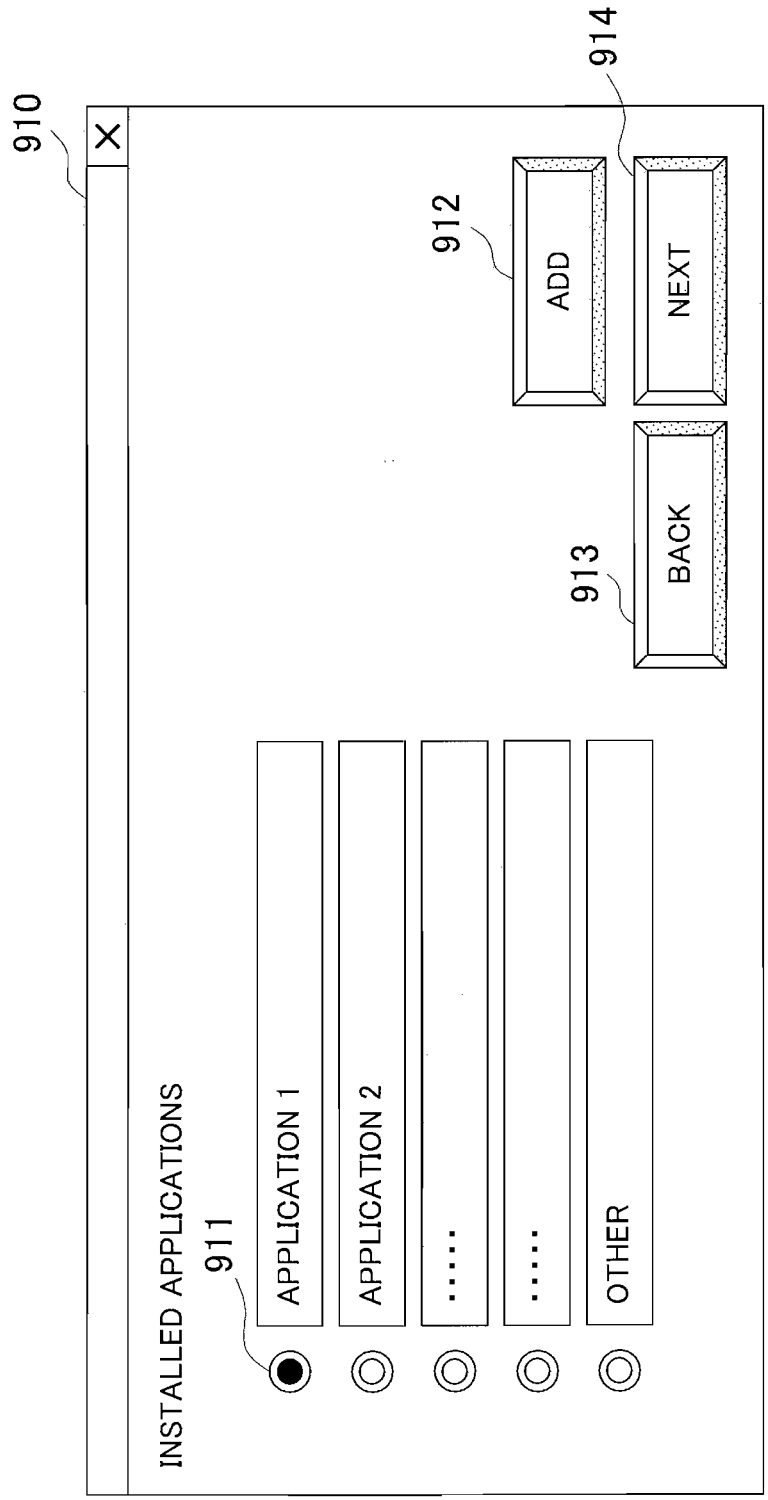
FIG. 30 is a conceptual diagram showing an example of a Tier ratio computation screen according to this embodiment.

In addition, in addition to the foregoing configuration design elements, an application which runs on the storage apparatus 200 is designated. For example, an application which runs on the storage apparatus 200 is designated by the system administrator as an application which is to be installed. More specifically, when Advanced settings in the installed application input field 903 in FIG. 28 is pressed, a Tier ratio calculation screen 910 in FIG. 30 is displayed on the management computer 300.

Figure 31:
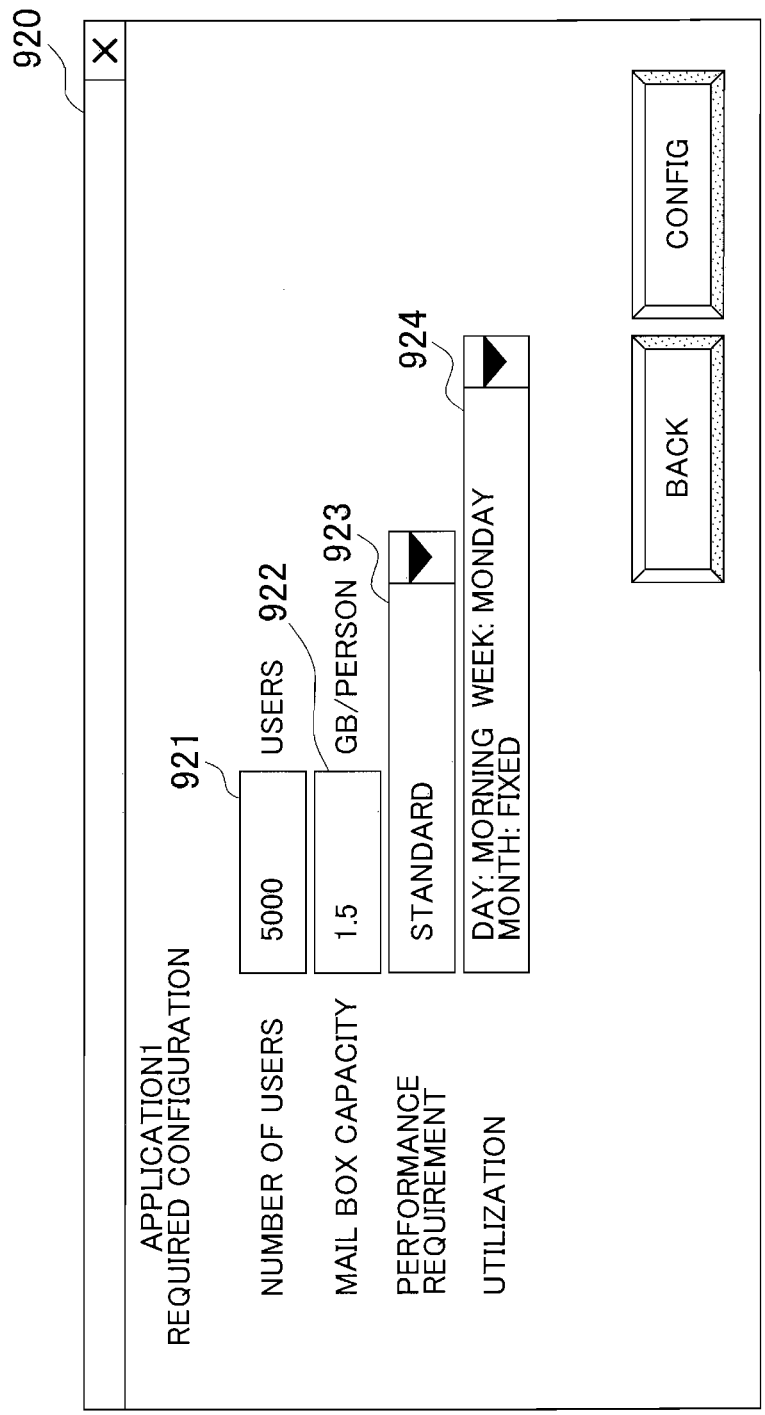
FIG. 31 is a conceptual diagram showing an example of a Tier ratio computation screen according to this embodiment.

For example, in cases where an application which is typically frequently used is pre-registered, the registered application is displayed on the Tier ratio calculation screen 910 in FIG. 3. Furthermore, when the application is selected by the system administrator via the Tier ratio calculation screen 910 by means of a radio button 911 and a NEXT button 914 is pressed, a Tier ratio calculation screen 920 which is shown in FIG. 31 is displayed. If a plurality of applications are used, applications which are designated via the Tier ratio calculation screen 910 are selected by means of radio buttons 911, the NEXT button 914 is pressed, and inputs are made as necessary via the Tier ratio computation screen 920, described subsequently. Furthermore, if the applications used are not displayed on the Tier ratio calculation screen 910, the name and so on of the applications used are input to an Other field and, after pressing an ADD button 912, the NEXT button 914 is pressed. The applications which have been input to the Other field are thus registered.

The Tier ratio calculation screen 920 shown in FIG. 31 is a screen for designating various requirements for applications. FIG. 31 is an example of the Tier ratio calculation screen 920 which is displayed if application 1 is selected via FIG. 30. The Tier ratio calculation screen 920 displays a designated item for designating requirements corresponding to each application. Furthermore, the addition and deletion of designated items which are displayed on the Tier ratio calculation screen 920 are made in response to inputs by the system administrator.

In FIG. 31, application) is an electronic mail application and, as shown in FIG. 31, application 1 is provided with a field 921 for inputting the number of users using the application, a field 922 for inputting the mail box capacity, a field 923 for designating the performance requirement of this application, and a field 924 for designating the utilization, or similar.

The field 923 for designating the performance requirements for the application enables any of the items high, standard, or low to be selected, for example. For example, standard is the standard required performance for pre-configured application 1. High is selected in cases where there are many users who use electronic mail more often than is standard and where a superior required performance is required. Low is selected in cases where electronic mail usage is substandard and where an inferior required performance is sufficient.

In addition, an operating state pattern is selected via the field 924 designating the utilization. Operating state patterns are patterns such as the time zone when access is most frequent in a single day (morning, afternoon, evening, night), the day when access is most frequent in a single week, and the date and time when access is most frequent in a single month, and combinations of these patterns for a single day, a single week, and a single month, for example, may be modeled and selections may be made from the modeled plurality of patterns.

Furthermore, the access distribution diagram shown in FIG. 29 may be retained from sample data and evaluation data or the like from previous actual results for each application, and Tier ratios may be calculated according to this access distribution. If an access distribution diagram of a plurality of patterns exists, a more accurate configuration design can be obtained by displaying a screen on which any of the patterns is selected on the management computer 300.

In addition, if the access pattern differs during the day for the utilization of an application, the day is divided into three times, namely, morning, afternoon, and evening, and a distribution diagram is created for each of these time zones, and the distribution diagrams are overlaid, whereby it is possible to design in detail the required amount for each storage tier in each time zone. For example, even when days are the units and assuming there is 100 GB of data which requires the performance of Tier 1, which is configured from SSD, if there is no overlap between the three time zones in a single day as the data is accessed, the data is migrated in these time zones. Accordingly, the capacity of Tier 1 may be secured in the time zone requiring the performance of Tier 1 which is configured from SSD and a detailed configuration design which considers costs more closely can be obtained.

Figure 32:
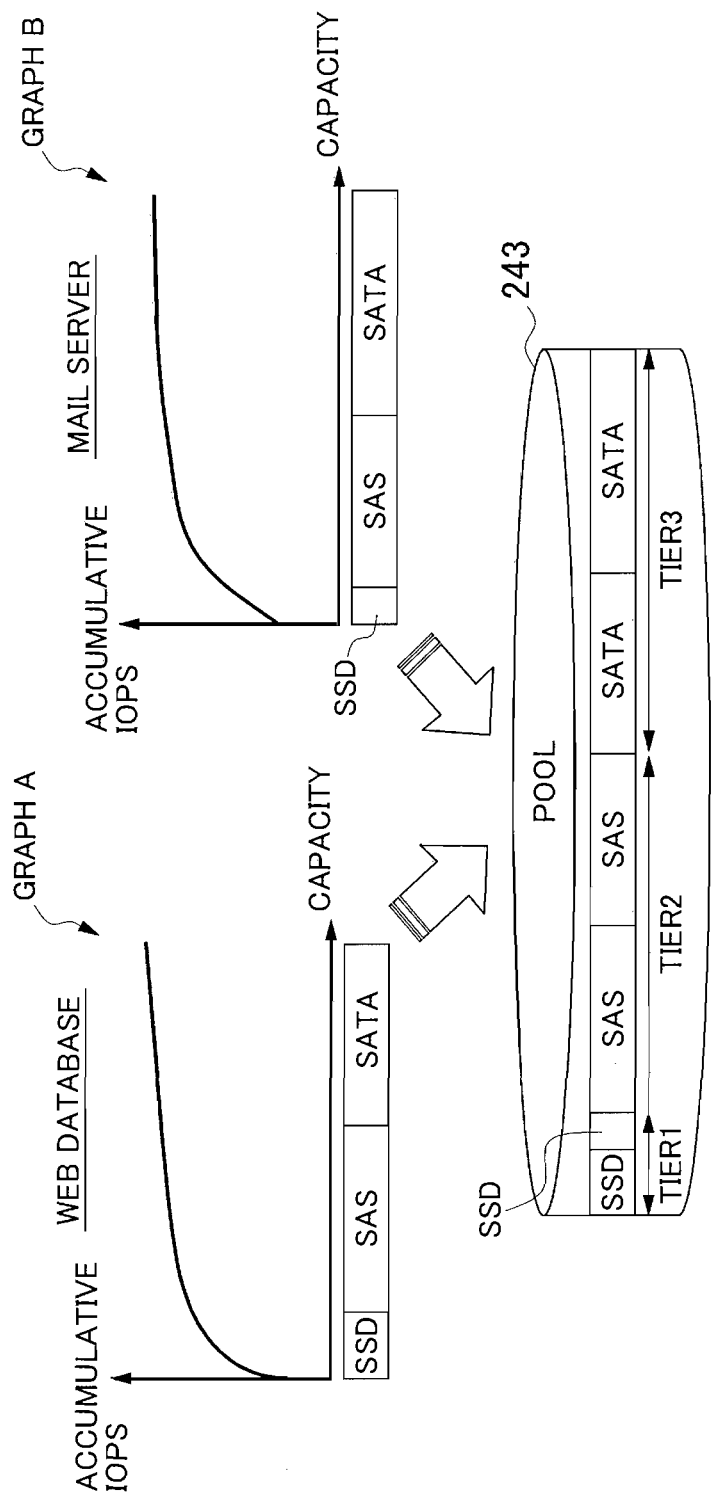
FIG. 32 is a conceptual diagram showing an example of a Tier ratio computation screen according to this embodiment.

Tier ratio computation processing which considers the operating state of a plurality of applications will be described next. For example, the Tier ratio is determined by considering the applications using a Web database and the operating states of the applications using the mail server. FIG. 32 shows the cumulative value for the IOPS for each application and the capacities required for each storage tier calculated from the IOPS cumulative values.

As shown in FIG. 32, the capacity required for each storage tier differs for each application. Therefore, by cumulatively adding the capacities required for each storage tier designed for each application, a configuration design which is closer to the actual operation can be realized. In FIG. 32, the capacities required for each storage tier are calculated simply by cumulatively adding the capacities required for each application; however, a more suitable configuration design for the capacities required for the storage tiers can be obtained by designing the configuration of the required amounts by also considering the operating states of each application.

Moreover, if, conventionally, cost reductions are implemented by migrating data between the tiers, the access frequency of the data is monitored with a focus on certain data and data is migrated to suitable tiers according to this access frequency. However, according to the present invention, in cases where the migration of data in cycles such as on a daily, weekly, and monthly basis, for example, can also be confirmed by managing the migration history of the migrated data, efficient data migration and the performance of the whole system can be improved by migrating data by estimating these cycles beforehand. For example, only the data of applications for which utilization has been designated may be a migration target in the Tier ratio calculation screen 920 in FIG. 31. Data control from an application perspective is possible by considering applications when data is migrated in this way. For example, with regard to data with predetermined attributes which is accessed by the applications designated by the system administrator, the required performance can also be secured by storing this data in fixed storage tiers as non-data migration targets.

Note that, although, according to the embodiment above, the microprocessor 212 (controller) of the storage apparatus 200 implements various functions of the virtual volume control program 250 of the present invention on the basis of various programs which are stored in the storage apparatus 200, the present invention is not limited to this example. For example, the microprocessor 212 may also be provided in an apparatus which is separate from the storage apparatus 200 and the various functions may be realized through co-operation with the microprocessor 212. Furthermore, the various programs stored in the storage apparatus 200 may also be provided in another apparatus which is separate from the storage apparatus 200 and the various functions may be realized as a result of these programs being called by the microprocessor 212.

Reference Signs List

100 Host computer
    110 Application
    200 Storage apparatus
    210 Controller
    211 Frontend interface
    212 Microprocessor
    213 Transfer circuit
    214 Memory
    215 Backend interface
    220 Connected device
    230 Storage device
    242 Virtual volume
    243 Pool
    244 Pool volume
    250 Virtual volume
    251 Virtual page management table
    252 Real page management table
    253 Performance monitoring table
    254 Virtual volume management table
    255 Drive performance rank table
    256 Performance table
    257 Hierarchical management table
    258 Tier ratio management table
    259 Assigned pool management table
    260 User configuration management table
    270 Configuration modification processing list
    300 Management computer

The invention claimed is:

1. A storage apparatus connected via a network to a host computer which requests data writing, comprising:

storage devices of a plurality of types of varying performance; and a controller which manages storage areas provided by each of the storage devices of a plurality of types by means of storage tiers of a plurality of different types, and which assigns the storage areas in page units to virtual volumes from any of the storage tiers among the storage tiers of the plurality of types according to the data write request from the host computer, wherein the controller monitors performance information which includes I/O characteristic information for each of the virtual volumes and determines the storage tiers corresponding to the performance information thus monitored, and assigns the storage areas in page units to the virtual volumes from the determined storage tiers, wherein the controller monitors performance information which includes I/O characteristic information for predetermined areas of the virtual volumes and determines the storage tiers corresponding to the performance information thus monitored for each of the predetermined areas of the virtual volumes, and assigns the storage areas in page units to the predetermined areas of the virtual volumes from the determined storage tiers, and wherein the controller assigns storage areas in page units from the storage tiers determined for the predetermined areas of the virtual volumes and calculates an assignment ratio of the storage tiers assigned to each of the virtual volumes.

2. The storage apparatus according to claim 1, wherein the controller stores the performance information of storage devices of the same type among the storage devices of the plurality of types, RAID configuration information, and storage tiers which correspond to a performance information of the storage devices and RAID configuration information of the storage devices in a drive performance rank table in association with one another, stores predetermined areas of the virtual volumes and performance information which includes I/O characteristic information which is monitored for each of the predetermined areas in a performance monitoring table in association with one another, and extracts the storage tiers which correspond to the performance information of the predetermined areas of the virtual volumes from the drive performance rank table.

3. The storage apparatus according to claim 1, wherein the controller modifies the assignment ratio of the storage tiers assigned to each of the virtual volumes according to the required performance of the host computer which accesses the virtual volume.

4. The storage apparatus according to claim 1, wherein the storage apparatus is communicably connected to a management computer, and wherein the controller calculates the assignment ratio of the storage tiers which are assigned to each of the virtual volumes according to the required performance which is indicated by the management computer.

5. The storage apparatus according to claim 1, wherein the controller, in a case where there is a difference between the storage tier already assigned to a predetermined area of the virtual volume and the storage tier which corresponds to the performance information of the predetermined area of the virtual volume, re-assigns a storage area storing data stored in an assigned storage area to the predetermined area of the virtual volume by migrating the data between the storage tiers.

6. The storage apparatus according to claim 5, wherein the controller determines whether there is a storage area which can be assigned to the storage tier which serves as the data migration destination when the storage area storing the data stored in the assigned storage area is re-assigned to the predetermined area of the virtual volume by migrating the data between the storage tiers, and, as a result of this determination, modifies the RAID configuration of a RAID group which constitutes the storage tier if there is no storage area which can be assigned to the storage tier which serves as the data migration destination.

7. The storage apparatus according to claim 6, wherein the controller creates a storage tier by modifying the RAID configuration of the storage area in cases where there is no storage area which can be assigned to the storage tier which serves as the data migration destination but where there is a storage area which can be assigned to the storage tier which serves as the data migration source.

8. A data management method for a storage apparatus which comprises storage devices of a plurality of types of varying performance, and a controller which manages storage areas provided by each of the storage devices of a plurality of types by means of storage tiers of a plurality of different types, and which assigns the storage areas in page units to virtual volumes from any of the storage tiers among the storage tiers of the plurality of types according to the data write request from the host computer, the data management method comprising:

a first step in which the controller monitors performance information for each of the virtual volumes and determines the storage tiers corresponding to the performance information thus monitored, and a second step in which the controller assigns the storage areas in page units to the virtual volumes from the determined storage tiers, wherein the controller monitors performance information which includes I/O characteristic information for predetermined areas of the virtual volumes and determines the storage tiers corresponding to the performance information thus monitored for each of the predetermined areas of the virtual volumes, and assigns the storage areas in page units to the predetermined areas of the virtual volumes from the determined storage tiers, and wherein the controller assigns storage areas in page units from the storage tiers determined for the predetermined areas of the virtual volumes and calculates an assignment ratio of the storage tiers assigned to each of the virtual volumes.

* * * * *